US009792547B2

(12) United States Patent
Nishitani et al.

(10) Patent No.: US 9,792,547 B2
(45) Date of Patent: *Oct. 17, 2017

(54) NEURAL NETWORK CIRCUIT AND LEARNING METHOD FOR NEURAL NETWORK CIRCUIT

(71) Applicant: Panasonic Intellectual Property Management Co., Ltd., Osaka (JP)

(72) Inventors: Yu Nishitani, Kyoto (JP); Michihito Ueda, Kyoto (JP); Yukihiro Kaneko, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 452 days.

This patent is subject to a terminal disclaimer.

(21) Appl. No.: 14/641,835

(22) Filed: Mar. 9, 2015

(65) Prior Publication Data

US 2015/0269483 A1 Sep. 24, 2015

(30) Foreign Application Priority Data

Mar. 18, 2014 (JP) ................................. 2014-054563

(51) Int. Cl.
*G06N 3/08* (2006.01)
*G06N 3/04* (2006.01)
*G06N 3/063* (2006.01)

(52) U.S. Cl.
CPC ............ *G06N 3/084* (2013.01); *G06N 3/063* (2013.01)

(58) Field of Classification Search
CPC .......... G06N 3/04; G06N 3/084; G06N 3/063; G06N 3/049; G06N 3/08

(Continued)

(56) References Cited

U.S. PATENT DOCUMENTS 5,004,932 A * 4/1991 Nejime ................ G06N 3/0635
326/36
5,519,812 A * 5/1996 Ishihara ............... G06N 3/0635
257/295

(Continued)

FOREIGN PATENT DOCUMENTS

| CN | 1577765 | 2/2005 |
| WO | 2012/164857 | 12/2012 |
| WO | 2013/111200 | 8/2013 |

OTHER PUBLICATIONS

Nishitani Y. et al., "Ferroelectric synapse device with brain-like learning function: Analog conductance control in a ferroelectric-gate field-effect transistor based on the timing difference between two pulses", Extended Abstracts of the 2012 International Conference on Solid State Devices and Materials, Kyoto, 2012, pp. 1140-1141.*

(Continued)

*Primary Examiner* — Dave Misir
(74) *Attorney, Agent, or Firm* — Wenderoth, Lind & Ponack, L.L.P.

(57) ABSTRACT

A neural network circuit includes an error calculating circuit that generates an error voltage signal having a magnitude in accordance with a time difference between an output signal and a teaching signal corresponding to the output signal. A weight change pulse voltage signal is input to a synapse circuit of a neural network circuit element including a neuron circuit that output the weight change pulse voltage signal, and a switching pulse voltage signal is input to a synapse circuit of a neural network circuit element other than the neural network circuit element including the neuron circuit that output the switching pulse voltage signal. The neural network circuit element changes the amplitude of the weight change pulse voltage signal on the basis of the error voltage signal generated by the error calculating circuit.

13 Claims, 24 Drawing Sheets

(58) Field of Classification Search
USPC .................................................. 706/25–26
See application file for complete search history.

(56) References Cited

U.S. PATENT DOCUMENTS

| | | | | |
|---|---|---|---|---|
| 5,588,090 A * | 12/1996 | Furuta | ................. | G06N 3/063 |
| | | | | 706/25 |
| 5,633,989 A * | 5/1997 | Shin | ................. | G06N 3/0635 |
| | | | | 706/35 |
| 2004/0084727 A1 * | 5/2004 | Ueda | ................. | G06N 3/0635 |
| | | | | 257/347 |
| 2005/0016684 A1 | 1/2005 | Sun et al. | | |
| 2007/0011120 A1 * | 1/2007 | Matsugu | ............ | G06K 9/00973 |
| | | | | 706/16 |
| 2013/0311414 A1 | 11/2013 | Nishitani et al. | | |

OTHER PUBLICATIONS

W. Maass, "Networks of Spiking Neurons: The Third Generation of Neural Network Models," Neural Networks, vol. 10, No. 9, pp. 1659-1671, 1997.

\* cited by examiner

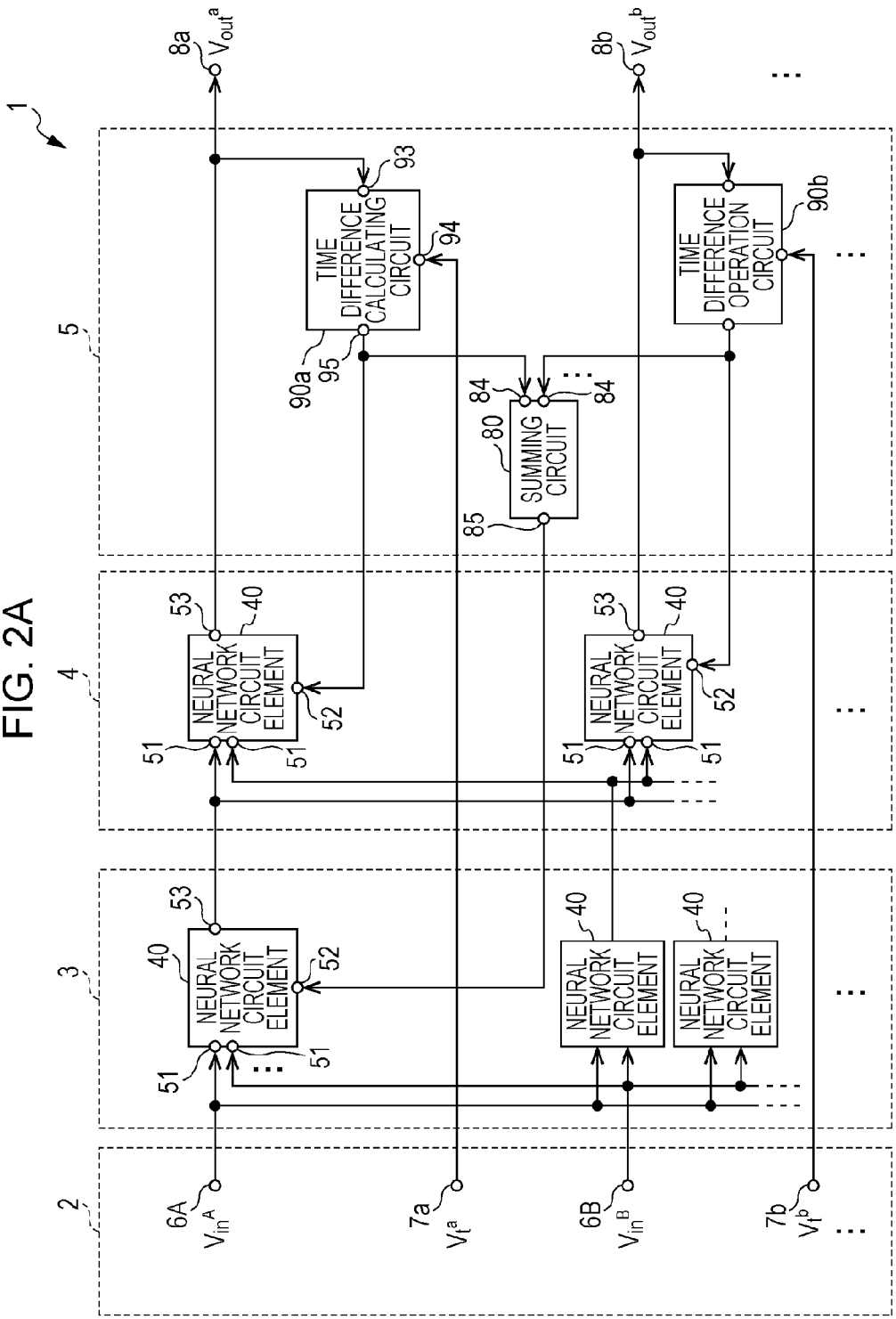

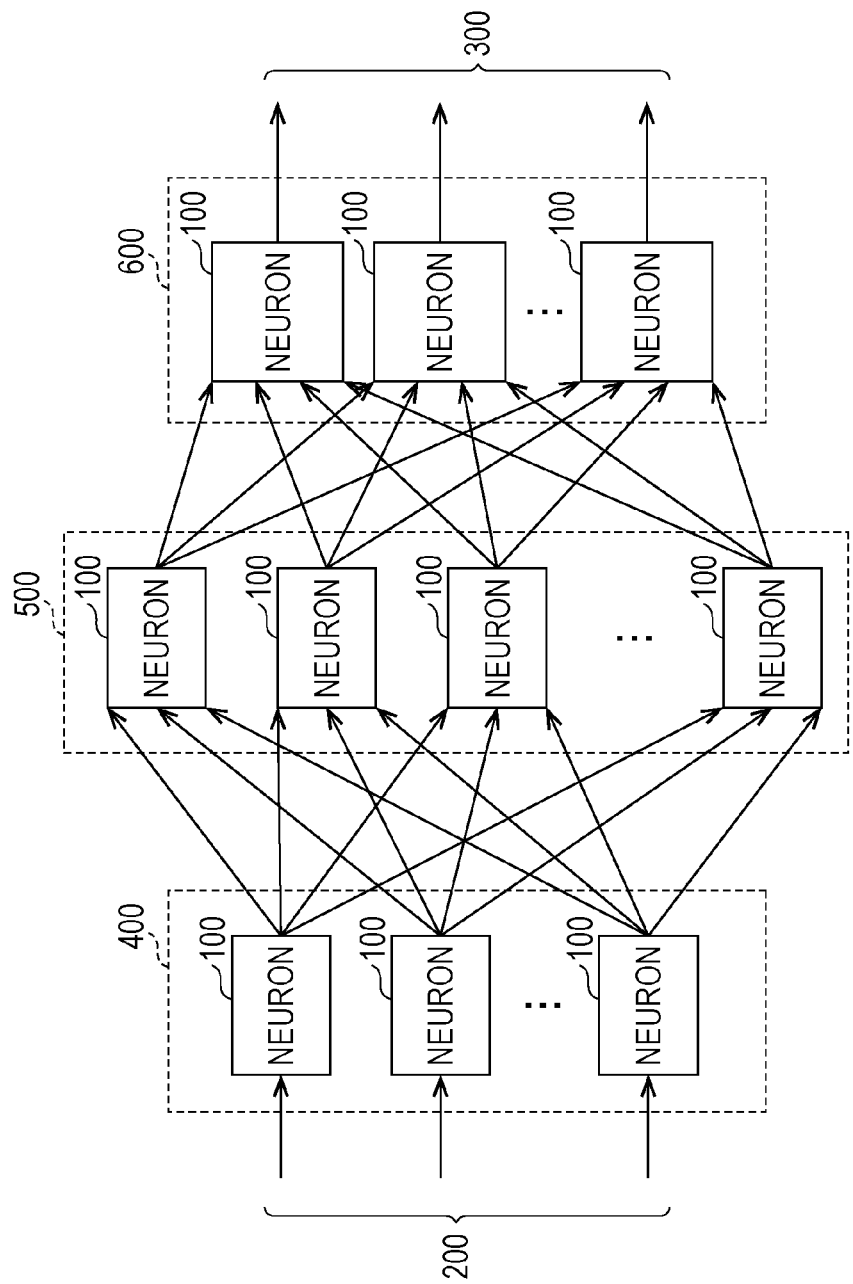

NEURAL NETWORK CIRCUIT AND LEARNING METHOD FOR NEURAL NETWORK CIRCUIT

BACKGROUND

1. Technical Field

The present disclosure relates to a neural network circuit and a learning method for the neural network circuit.

2. Description of the Related Art

Nowadays, a research on a computer that runs on the basis of a simulation model of brain information processing of living bodies is under way. The most basic processing model is a neural network. For example, a model that expresses information using the timing of a pulse (a spiking neuron model) is described in W. Maass, "Networks of Spiking Neurons: The Third Generation of Neural Network Models," Neural Networks, Vol. 10, No. 9, pp. 1659-1671, 1997. According to this non-patent literature, a spiking neuron model has a computational performance higher than existing models that do not use a pulse.

In addition, Japanese Patent No. 5289647, for example, describes the configuration of a neuron circuit that performs a learning operation using a pulse timing and that can be formed from a number of elements smaller than existing circuits.

SUMMARY

If a neural network includes a large number of neurons, an enormous amount of computation in software computing is required and, thus, the computation time becomes long. Accordingly, the dedicated hardware has been developed. However, it is difficult to perform error back-propagation learning by simply connecting neuron circuits that realize learning operation using a pulse timing described in Japanese Patent No. 5289647 with one another.

The error back-propagation learning is a most widely used supervised learning technique in layered neural networks. In error back-propagation learning, a teaching signal is input in addition to an input signal, and learning is conducted so that an error between an output signal and the teaching signal is minimized. Japanese Patent No. 5289647 describes neither a method for calculating an error nor a method for updating a weight so that the weight reflects a calculated error.

One non-limiting and exemplary embodiment provides a neural network circuit capable of appropriately performing an error back-propagation learning operation.

In one general aspect, the techniques disclosed here feature a neural network circuit including a plurality of neural network circuit elements, an error calculating circuit, at least one input signal terminal, and at least one output signal terminal. At least one output signal output from the at least one output signal terminal is obtained from an input signal input to the at least one input signal terminal. The error calculating circuit receives the at least one output signal and teaching signals equal in number to a number of the at least one output signal terminal and generates an error voltage signal representing a voltage signal having an amplitude in accordance with a time difference between the output signal and the teaching signal corresponding to the output signal. Each of the neural network circuit elements includes at least one synapse circuit and a neuron circuit. The synapse circuit includes a variable resistive element having a resistance value that varies when a pulse voltage is applied. The neuron circuit includes a waveform generating circuit, and the waveform generating circuit generates a weight change pulse voltage signal having a predetermined first waveform that rises from a reference value to a predetermined peak value and then falls again to the reference value as time passes and a switching pulse voltage signal having a predetermined second waveform that determines a predetermined duration. The weight change pulse voltage signal is input to the synapse circuit of the neural network circuit element including the neuron circuit that outputs the weight change pulse voltage signal, and the switching pulse voltage signal is input to the synapse circuit of the neural network circuit element other than the neural network circuit element including the neuron circuit that outputs the switching pulse voltage signal. The neural network circuit element changes the amplitude of the weight change pulse voltage signal on the basis of the error voltage signal generated by the error calculating circuit. For the predetermined duration of the switching pulse voltage signal input from the neural network circuit element other than the neural network circuit element including the synapse circuit, the synapse circuit changes the resistance value of the variable resistive element of the synapse circuit using a voltage in accordance with a time difference between the switching pulse voltage signal and the weight change pulse voltage signal generated by the neuron circuit of the neural network circuit element including the synapse circuit.

According to the present disclosure, an error back-propagation learning operation can be appropriately performed.

It should be noted that these general and specific aspects may be implemented as a system, a method, an integrated circuit, a computer program, or a computer-readable recording medium, or any combination of an apparatus, a system, a method, an integrated circuit, a computer program, and a computer-readable recording medium. Examples of the computer-readable recording medium include a nonvolatile recording medium, such as a Compact Disc-Read Only Memory (CD-ROM).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2A is a block diagram illustrating an example of the configuration of the neural network circuit formed using the neural network circuit element of FIG. 1;

FIG. 16A is a schematic illustration of a layered neural network;

DETAILED DESCRIPTION

Description of Neural Network

Figure 16B:
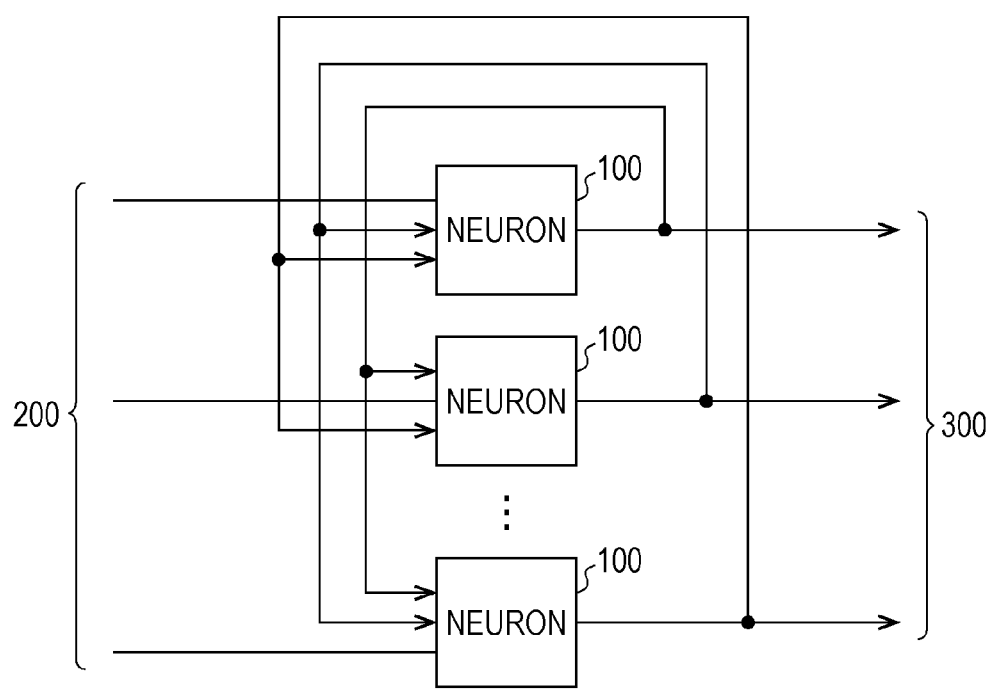
FIG. 16B is a schematic illustration of a mutually connected neural network.

Embodiments of the present disclosure is predicated on a neural network. Accordingly, a neural network and the issues of existing neural network circuits that provide the neural network are described in detail first. As described above, a neural network is a simulation model of a neural circuit network of living bodies. The neural network performs information processing by using a neuron that simulates a neuron cell, which is a function unit of a neural circuit network, as a function unit and disposing a plurality of neurons in a network form. Examples of the neuron network include a layered neural network having neurons 100 connected in layers (refer to FIG. 16A) and a mutually connected neural network (a Hopfield network) having neurons 100 mutually connected with one another (refer to FIG. 16B).

A neural network has two primary functions. One is a "processing" function to obtain an output from inputs, and the other is a "learning function" to set a relationship between an input and an output of a whole neural network to a desired relationship.

Processing Function

The operation performed in information processing is described below with reference to a layered neural network. The layered neural network illustrated in FIG. 16A includes the following three layers: an input layer 400, an intermediate layer 500, and an output layer 600. Each of the layers includes at least one neuron 100. Each of the neurons 100 in the input layer 400 is connected to each of the neurons 100 in the intermediate layer 500. Similarly, each of the neurons 100 in the intermediate layer 500 is connected to each of the neurons 100 in the output layer 600. An input signal 200 is input to the input layer 400 and is propagated to the intermediate layer 500 and to the output layer 600. Thereafter, the input signal 200 is output from the output layer 600. In the neuron 100, a predetermined arithmetic operation (described below) is performed on an input value, and the output value is propagated to a neuron in the next layer. Accordingly, the output value output from the output layer 600 serves as a final output 300 of the neural network. The above-described series of processes represent the information processing performed by the neural network. If the number of neurons included in the intermediate layer 500 is sufficiently increased, any input and output can be provided. While the layered neural network illustrated in FIG. 16A includes three layers, a plurality of the intermediate layers 500 may be employed.

Figure 17:
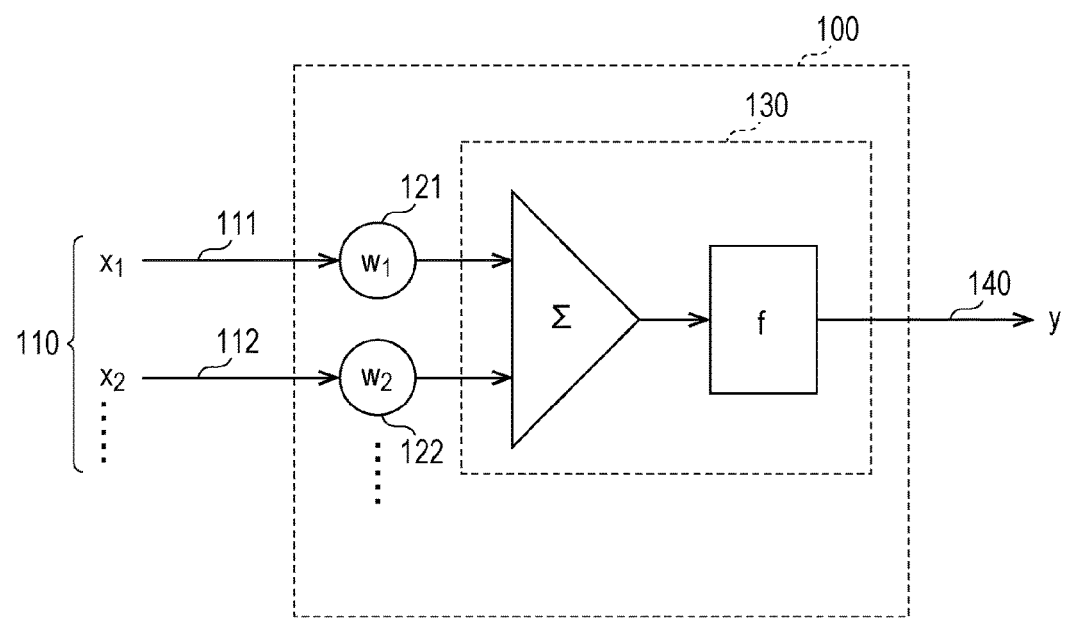
FIG. 17 is a schematic illustration of a common neuron.

A neuron that serves as a constituent unit of the neural network is described next. FIG. 17 is a schematic illustration of a widely used neuron. The neuron 100 includes synapse portions 121 and 122 and a neuron portion 130. Note that the number of synapse portions is equal to the number of the neurons connected to the previous stage, that is, the number of input signals. The synapse portion 121 assigns a weight to each of a plurality of input signals 111 input from the outside. The synapse portion 122 assigns a weight to an input signal 112 input from the outside. Each of weights ($w_1$, $w_2$) is called "connection weight". The neuron portion 130 sums the input signals each weighted by the synapse portion, performs a nonlinear arithmetic operation on the sum, and outputs the result of the operation. Let $x_i$ (1, 2, ..., n) be the input signals from the outside. Then, n is the same as the number of input signals. Each of the synapse portions 121 and 122 multiplies the input signal by the corresponding one of the connection weight $w_i$ (1, 2, ..., n), and the neuron portion 130 calculates a sum $V_n$ of the products, as follows:

$$V_n = \Sigma w_i x_i \quad (1)$$

where $\Sigma$ denotes the summation sign with respect to i.

In addition, the neuron portion performs a nonlinear arithmetic operation f on the obtained sum $V_n$ and defines the result as an output value y. Accordingly, the output y of the neuron is expressed as follows:

$$y=f(V_n) \quad (2).$$

Note that a monotonically increasing function with saturation is used as the nonlinear arithmetic function f. For example, a step function (a staircase function) or a sigmoid function is used as the nonlinear arithmetic function f.

Since a plurality of the neuron portions 130 can simultaneously perform an arithmetic operation in a neural network circuit, the neural network circuit has a parallel processing property. That is, unlike the sequential information processing performed by an existing computer, the neural network circuit can parallel information processing.

Learning Function

One of the important characteristics of the neural network is that the neural network has a "learning function" in addition to a "processing function" for obtaining an output from an input, as described above. As used herein, the term "learning" refers to setting the relationship between an input and an output of the whole neural network circuit to a desired relationship by updating the connection weight of each of the above-described synapse portions.

The "learning" is primarily categorized into "unsupervised learning" and "supervised earning". In the unsupervised learning, by inputting input signals to a neural network, a correlative relationship among the input signals input to the neural network is learned by the network. In contrast, in the supervised learning, input signals and a desired output signal corresponding to the input signals are given to a neural network. The desired output signal is referred to as a "teaching signal". Thereafter, learning is conducted so that an output signal obtained when the input signals are given to the neural network is the same as the teaching signal. In the layered neural network illustrated in FIG. 16A, a learning method called error back-propagation learning is widely employed.

The error back-propagation learning is conducted as follows:

1. Samples for learning conducted by a neural network (input signals and a teaching signal) are provided to the neural network.
2. An actual output of the network resulted from the input signals is compared with the teaching signal, and an error between the output of the network and the teaching signal is calculated.
3. The connection weight of each of synapses is adjusted so that the error becomes small.
4. The connection weights are adjusted in order of proximity of the synapse to the output layer (in a direction toward a synapse in the input layer).
5. The above-described steps 1 to 4 are repeated for all the samples.
6. The above-described steps 1 to 5 are repeated for all the samples until the error reaches a predetermined value.

As the name of the algorithm "error back-propagation learning" implies, the error propagates from the neuron in the input layer to the neuron in the output layer during the error back-propagation learning.

Spiking Neuron Model

The processing function and the learning function of a neural network have been described above. In the model used in the above description, a signal that propagates between the neurons is in the form of an analog value representing an electric current or potential. In contrast, it is known that the neuron cells of a living body exchange a pulse having a substantially constant shape (a spike pulse). Accordingly, a model that more accurately simulates the neuron circuit of a living body and directly handles the pulse (i.e., a spiking neuron model) has been developed. Examples of a spiking neuron model include a model that expresses analog information using the number of propagated pulses for a certain period of time (a pulse density model) and a model that expresses analog information using a time interval between pulses (a pulse timing model). Such spiking neuron models can provide higher computational performance than existing neural networks using a sigmoid function.

Figure 18:
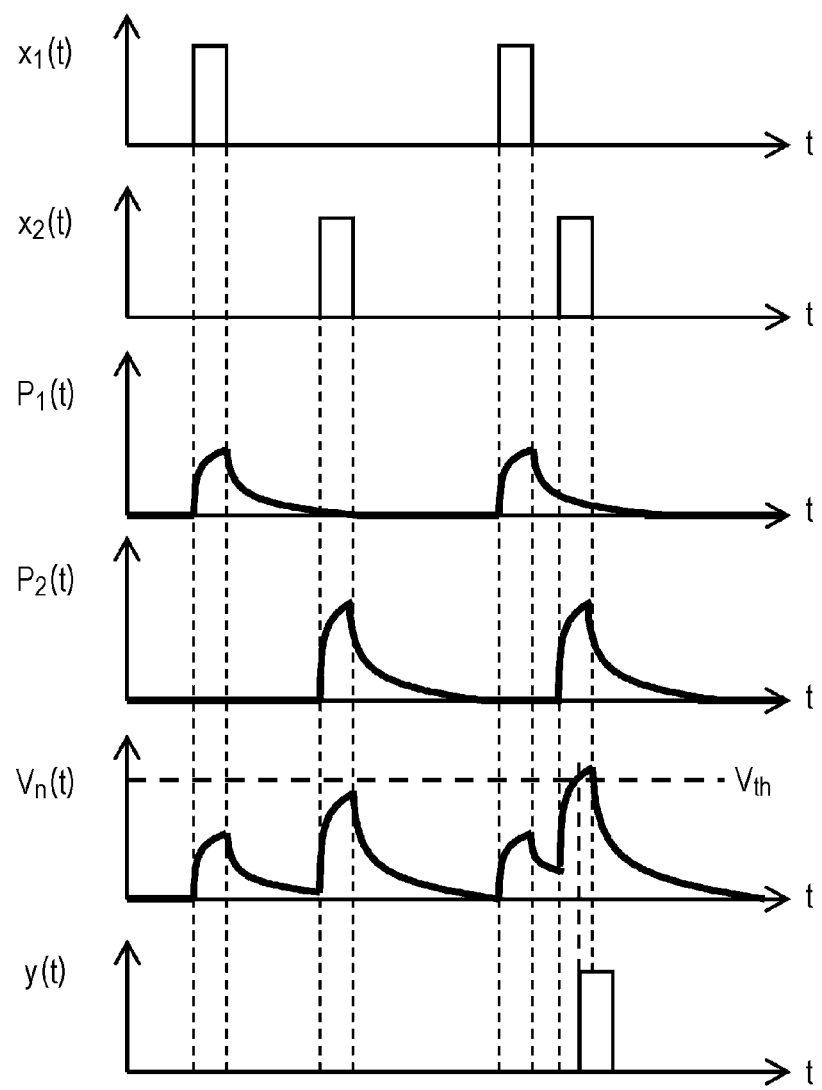
FIG. 18 is a graph illustrating a temporal change in each of the values of a neuron portion having two input terminals.

As an operation model of the neuron portion that can express information using a pulse as described above, an integrate-and-fire model has been developed. FIG. 18 is a graph illustrating a temporal change in each of the values of the neuron portion having two input terminals.

As illustrated in FIG. 18, when an input pulse $x_1(t)$ is input to the synapse portion 121 and an input pulse $x_2(t)$ is input to the synapse portion 122 from the outside or another neuron portion, a monomodal variation of the voltage occurs in each of the synapse portions 121 and 122. Such potential of the synapse portion is referred to as post-synaptic potential (hereinafter referred to as "PSP"). FIG. 18 illustrates a temporal changes $P_1(t)$ and $P_2(t)$ in the PSP of the synapse portion 121 and the synapse portion 122, respectively. The height of the PSP is proportional to the synapse connection weight. Note that t represents a time.

The neuron portion 130 calculates the sum of the PSPs of the synapse portions 121 and 122 connected to the neuron portion 130. The sum is referred to as an "internal potential $V_n(t)$" of the neuron portion 130. As illustrated in FIG. 18, if the neuron portion 130 has two input terminals, the internal potential $V_n(t)$ is the sum of $P_1(t)$ and $P_2(t)$. In general, an internal potential $V_n(t)$ is expressed as follows:

$$V_n(t)=\Sigma P_i(t) \quad (3)$$

where Pi denotes the PSP of i-th synapse portion, and $\Sigma$ denotes the summation sign with respect to i.

As illustrated in FIG. 18, if the internal potential $V_n$ exceeds a predetermined threshold value $V_{th}$, the neuron portion outputs a pulse signal y(t). This operation is referred to as "neuronal firing" of the neuron portion. The pulse output y(t) is output from the neuron portion and is input to another neuron portion.

Neural Network Integrated-Circuit

A neural network has been schematically described above. To configure a neural network, an issue is how the above-described neuron is actually achieved. The most popular method for realizing the function of the neuron is to use a software process running on an existing computer. However, in such a method, a central processing unit (CPU) performs the processes of a plurality of neurons in a time multiplexed manner. That is, the desired parallel information processing is not performed. As described above, the neural network based on information representation by a pulse timing can provide a high performance. However, if the function of the neuron is provided using a software process, an enormous amount of processing time is required. Accordingly, it is difficult to obtain the high computational performance that the spiking neural network can provide. As a result, it is essential that a spiking neuron is configured by hardware and is formed as an integrated circuit.

Figure 19:
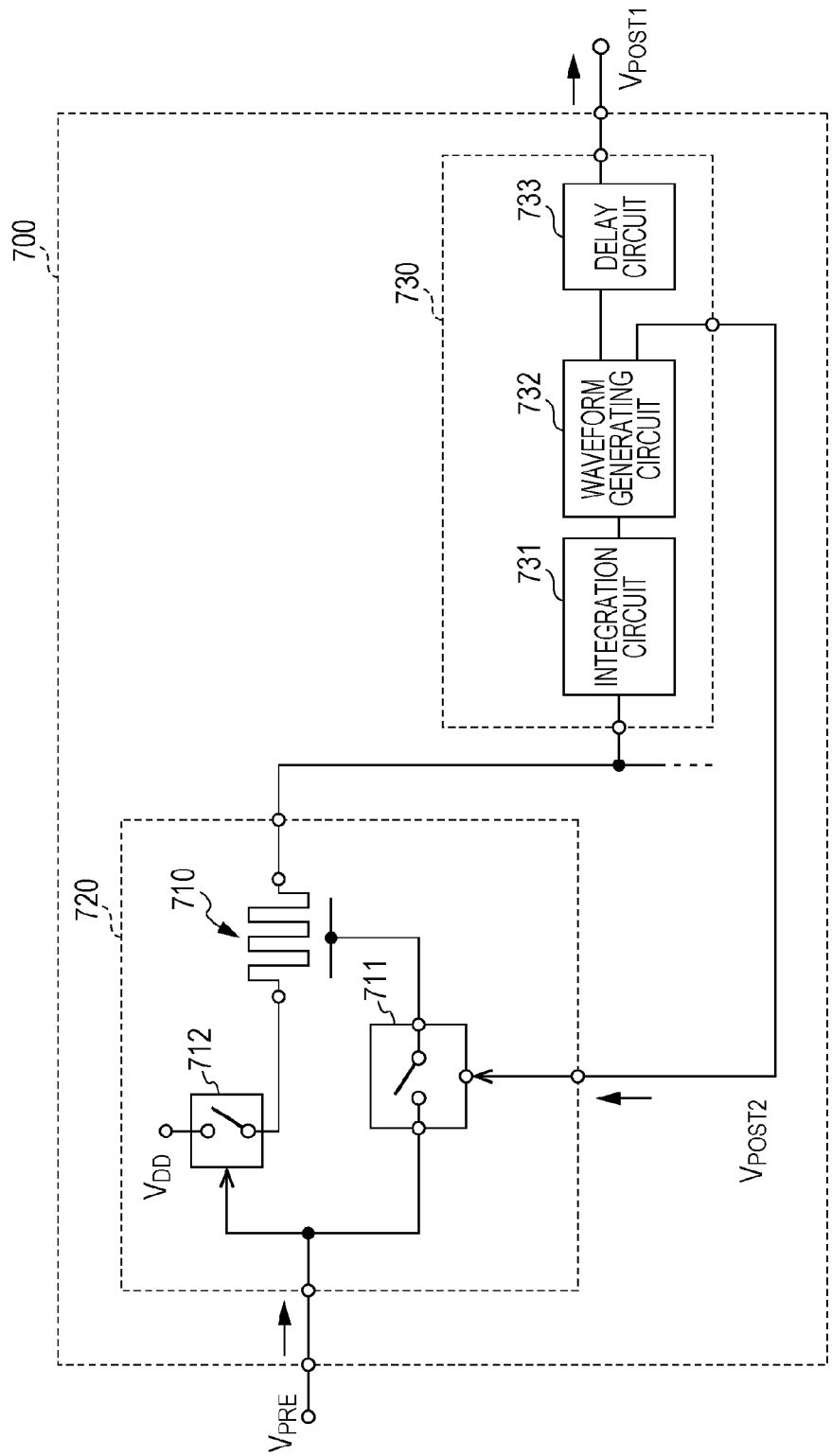
FIG. 19 is a circuit diagram illustrating an existing neural network circuit element.

Japanese Patent No. 5289647 describes a particular example that achieves a neuron that operates on the basis of the spiking neuron model by hardware (a neural network circuit element). FIG. 19 illustrates an existing neural network circuit element. FIG. 19 illustrates the configuration similar to that illustrated in FIG. 1 of Japanese Patent No. 5289647. A neural network circuit element 700 illustrated in FIG. 19 corresponds to the above-described neuron 100.

As illustrated in FIG. 19, the neural network circuit element 700 includes a synapse circuit 720 and a neuron circuit 730. The synapse circuit 720 corresponds to the above-described synapse portion 120, and the neuron circuit 730 corresponds to the above-described neuron portion 130. The synapse circuit 720 includes a variable resistive element 710, a selector circuit 711, and a switch circuit 712. The variable resistive element 710 stores the resistance value thereof as a synapse connection weight.

The neuron circuit 730 includes an integration circuit 731, a waveform generating circuit 732, and a delay circuit 733. The delay circuit 733 outputs a pulse voltage signal $V_{POST1}$ to another neural network circuit element. The waveform generating circuit 732 feeds back a switching pulse voltage signal $V_{POST2}$ to the selector circuit 711 in the same neural network circuit element 700.

As described above, according to Japanese Patent No. 5289647, the learning function is achieved by controlling the selector circuit 711 using the switching pulse voltage signal $V_{POST2}$ that is fed back to the selector circuit 711 and switching whether a voltage pulse signal $V_{PRE1}$ is to be input to a gate electrode of the variable resistive element 710. In this manner, the learning function based on spike-timing dependent synaptic plasticity (hereinafter abbreviated as STDP) is achieved.

Note that while Japanese Patent No. 5289647 describes the learning method for a single neuron in the neural network circuit element, any learning method performed in a network formed by connecting a plurality of neurons is not described. In an actual use environment of a neural network, neural network circuit elements are connected to one another to form a network. Thereafter, learning needs to be conducted to provide the calculation function of the network. That is, by simply connecting the neurons described in Japanese Patent No. 5289647 with one another to form a layered neural network, back-propagation learning that is widely used in layered neural networks cannot be conducted. Furthermore, more particularly, in error back-propagation learning, a teaching signal is input in addition to input signals, and learning is conducted so that an error between an output signal and the teaching signal becomes small. Accordingly, the error needs to be calculated, and the calculated error needs to be reflected in updating of the weight.

Particular Aspects

According to an aspect of the present disclosure, a neural network circuit including a plurality of neural network circuit elements, an error calculating circuit, at least one input signal terminal, and at least one output signal terminal. At least one output signal output from the at least one output signal terminal is obtained from an input signal input to the at least one input signal terminal. The error calculating circuit receives the at least one output signal and teaching signals equal in number to a number of the at least one output signal terminal and generates an error voltage signal representing a voltage signal having an amplitude in accordance with a time difference between the output signal and the teaching signal corresponding to the output signal. Each of the neural network circuit elements includes at least one synapse circuit and a neuron circuit. The synapse circuit includes a variable resistive element having a resistance value that varies when a pulse voltage is applied. The neuron circuit includes a waveform generating circuit, and the waveform generating circuit generates a weight change pulse voltage signal having a predetermined first waveform that rises from a reference value to a predetermined peak value and then falls again to the reference value as time passes and a switching pulse voltage signal having a predetermined second waveform that determines a predetermined duration. The weight change pulse voltage signal is input to the synapse circuit of the neural network circuit element including the neuron circuit that outputs the weight change pulse voltage signal, and the switching pulse voltage signal is input to the synapse circuit of the neural network circuit element other than the neural network circuit element including the neuron circuit that outputs the switching pulse voltage signal. The neural network circuit element changes the amplitude of the weight change pulse voltage signal on the basis of the error voltage signal generated by the error calculating circuit. For the predetermined duration of the switching pulse voltage signal input from the neural network circuit element other than the neural network circuit element including the synapse circuit, the synapse circuit changes the resistance value of the variable resistive element of the synapse circuit using a voltage in accordance with a time difference between the switching pulse voltage signal and the weight change pulse voltage signal generated by the neuron circuit of the neural network circuit element including the synapse circuit.

According to the above-described configuration, by converting the time difference between the output signal and the teaching signal into a voltage signal, the magnitude of a voltage signal for changing the weight of a synapse can reflect the magnitude of an error between the output signal and the teaching signal. Accordingly, the weight can be changed so that an error between the output signal and the teaching signal decreases. In this manner, the error back-propagation learning can be appropriately conducted.

If a time difference between the teaching signal and the output signal is zero, the teaching signal may have a reference potential. If the time difference between the teaching signal and the output signal is within a predetermined range and a center potential is defined as the reference potential, the potential difference of the teaching signal from the center potential may increase with increasing time difference in a bipolar manner. If the time difference between the teaching signal and the output signal is outside the predetermined range, the amplitude of the teaching signal may be maintained at a maximum value of the potential difference obtained in the predetermined range. In this manner, the time difference between the output signal and the teaching signal can be efficiently converted into a voltage signal.

The error calculating circuit may include time difference calculating circuits equal in number to the number of the output signal terminals and a summing circuit. Each of the time difference calculating circuits may generate the error voltage signal in accordance with a time difference between the output signal output from the corresponding output signal terminal and the teaching signal corresponding to the output signal and input the error voltage signal to the neuron circuit included in the neural network circuit element having an output signal that is the same as the output signal output from the output signal terminal. The summing circuit may generate a sum voltage signal obtained by summing the error voltage signals generated by the time difference calculating circuits and input the sum voltage signal the neuron circuit included in the neural network circuit element having an output signal that is not the same as the output signal output from the output signal terminal. In this manner, for the neural network circuit element having an output signal that is the same as the output signal output from the output signal terminal of the neural network circuit (the neural network circuit element included in the output layer), the weight can be changed so as to decrease the error between the corresponding output signal and the teaching signal on the basis of the error. Furthermore, for the neural network circuit element having an output signal that is not the same as an output signal output from the output signal terminal of the neural network circuit (the neural network circuit element included in the intermediate layer), the weight can be changed on the basis of the sum voltage signal obtained by summing the generated error voltage signals. Thus, error back-propagation learning can be conducted for all the neural network circuit elements including the neural network circuit elements included in the output layer.

The variable resistive element may include a first terminal, a second terminal, and a third terminal. A constant voltage based on the switching pulse voltage signal input from the neural network circuit element other than the neural network circuit element including the variable resistive element may be applied between the first terminal and the second terminal. A voltage in accordance with a time difference between the switching pulse voltage signal and the weight change pulse voltage signal generated by the neuron circuit of the neural network circuit element including the variable resistive element may be applied between the first terminal and the third terminal for the predetermined duration of the switching pulse voltage signal input from the neural network circuit element other than the neural network circuit element including the variable resistive element, and a resistance value between the first terminal and the second terminal may vary in accordance with a potential difference between the first terminal and the third terminal.

The synapse circuit may include a first switch that connects and disconnects the third terminal of the variable resistive element from a terminal to which the weight change pulse voltage signal generated by the neuron circuit of the neural network circuit element including the variable resistive element is input, and the first switch may control the connection and disconnection on the basis of the switching pulse voltage signal input from the neural network circuit element other than the neural network circuit element including the variable resistive element.

The variable resistive element may be a ferroelectric memristor.

The ferroelectric memristor may include a control electrode formed on a substrate, a ferroelectric layer in contact with the control electrode, a semiconductor layer formed on the ferroelectric layer, and a first electrode and a second electrode formed on the semiconductor layer, and a resistance value between the first electrode and the second electrode may vary in accordance with a potential difference between the first electrode and the control electrode.

The neuron circuit may include an integration circuit that integrates a value of an electric current flowing in the variable resistive element of the synapse circuit and a waveform generating circuit that generates the first waveform and the second waveform in accordance with the electric current integrated by the integration circuit. The waveform generating circuit may include a multiplier circuit that multiplies a magnitude of the first waveform by a magnitude of the error voltage signal.

The synapse circuit may include a second switch having one end connected to a first reference voltage source and the other end connected to the first terminal of the variable resistive element, and the second switch may connect the first reference voltage source to the first terminal for the predetermined duration of the switching pulse voltage signal input from the different neural network circuit element.

According to an another aspect of the present disclosure, a learning method for use in a neural network circuit having the above-described configuration is provided. The learning method includes changing an amplitude of the weight change pulse voltage signal output from the neuron circuit of a first neural network circuit element representing the neural network circuit element having an output signal serving as the output signal of the output signal terminal on the basis of the error voltage signal and, subsequently, changing an amplitude of the weight change pulse voltage signal output from the neuron circuit of a second neural network circuit element representing the neural network circuit element having an output signal that is not the output signal output from the output signal terminal on the basis of the error voltage signal.

According to the above-described learning method, the weight is changed on the basis of the error back-propagation learning for the first neural network circuit element first. Thereafter, for the second neural network circuit element, the weight is changed on the basis of the error back-propagation learning. Thus, the weight can be changed for the synapse circuit of each of the neural network circuit elements so that the error efficiently decreases. As a result, the error back-propagation learning can be appropriately conducted.

The above-described learning method may further include a first step and a second step. The first step may include changing the resistance value of the variable resistive element of the first neural network circuit element with the resistance value of the variable resistive element of the second neural network circuit element remaining unchanged by inputting a signal having potential that is the same as the reference potential to the synapse circuit of the second neural network circuit element instead of inputting the weight change pulse voltage signal. The second step may include changing the resistance value of the variable resistive element of the second neural network circuit element by causing the synapse circuit of the second neural network circuit element to generate the weight change pulse voltage signal having the first waveform generated by the neuron circuit of the neural network circuit element including the synapse circuit. The first step and the second step may be repeated until a time difference between the teaching signal and the corresponding output signal reaches a predetermined value or less.

According to still another aspect of the present disclosure, a neural network circuit includes an error calculating circuit to which an output signal and a teaching signal are input, where the error calculating circuit generates an error signal having a voltage according to a time difference between the output signal and the teaching signal, first one or more neural network circuit elements included in an intermediate layer of the neural network circuit, and second one or more neural network circuit elements included in an output layer of the neural network circuit, where the output layer outputs the output signal. Each of the first one or more neural network circuit elements includes first one or more synapse circuits and a first neuron circuit. Each of the second one or more neural network circuit elements includes second one or more synapse circuits and a second neuron circuit. Each of the first one or more synapse circuits and the second one or more synapse circuits includes a variable resistive element having a resistance value that varies in accordance with a voltage value of a pulse voltage applied to the variable resistive element. Each of the first neuron circuit and the second neuron circuit includes a waveform generating circuit that generates a weight change pulse voltage signal having a waveform that rises from a reference value to a peak value and then falls again to the reference value as time passes and a switching pulse voltage signal. A first weight change pulse voltage signal representing the weight change pulse voltage signal generated by the first neuron circuit is input to each of the first one or more synapse circuits. A second weight change pulse voltage signal representing the weight change pulse voltage signal generated by the second neuron circuit is input to each of the second one or more synapse circuits. A first switching pulse signal representing the switching pulse signal generated by the first neuron circuit is input to each of the second one or more synapse circuits. An amplitude of the first weight change pulse voltage signal and an amplitude of the second weight change pulse voltage signal are determined on the basis of the error signal, and the resistance value of the variable resistive element included in the variable resistive element included in each of the second one or more synapse circuits is varied on the basis of a duration of the first switching pulse voltage signal and a voltage in accordance with a time difference between the first switching pulse voltage signal and the second weight change pulse voltage signal.

The switching pulse voltage signal generated by the second neuron circuit may be the output signal.

A neural network circuit and a learning method for use in the neural network circuit according to exemplary embodiments of the present disclosure are described below with reference to the accompanying drawings.

Exemplary Embodiment

Figure 1:
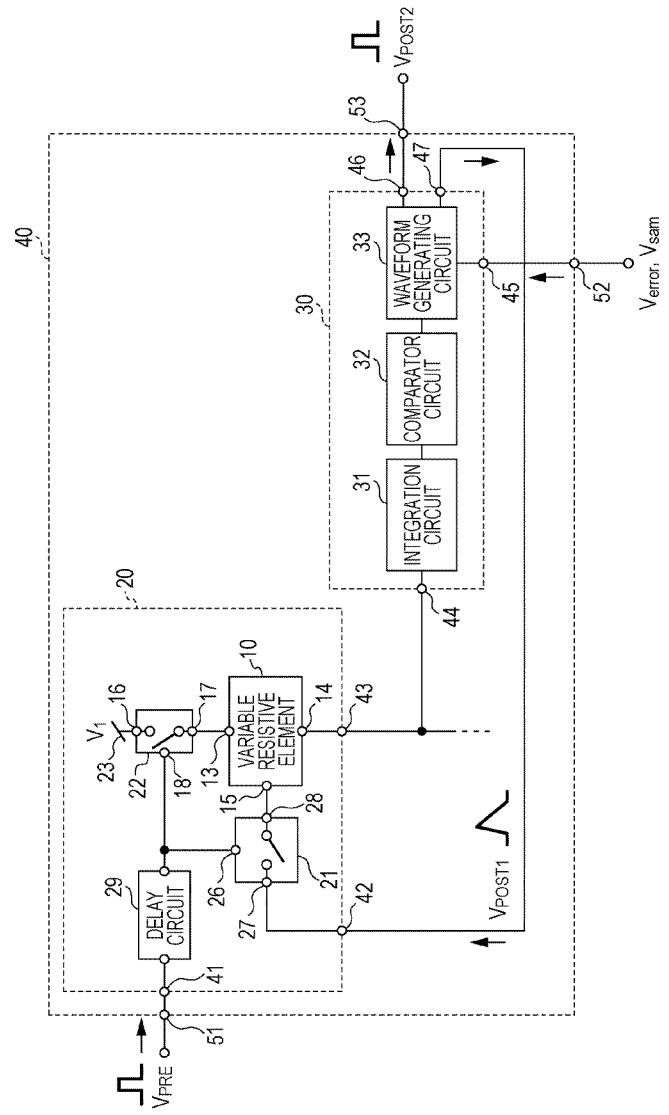
FIG. 1 is a block diagram schematically illustrating the configuration of a neural network circuit element that forms a neural network circuit according to an exemplary embodiment of the present disclosure.

An exemplary embodiment of the present disclosure is described below. FIG. 1 is a block diagram schematically illustrating the configuration of the neural network circuit element that forms a neural network circuit according to the present exemplary embodiment of the present disclosure. FIG. 2A is a block diagram illustrating an example of the configuration of the neural network circuit formed using the neural network circuit element of FIG. 1.

As illustrated in FIG. 2A, a neural network circuit 1 is formed by connecting an input layer 2, an intermediate layer 3, an output layer 4, and an error calculating circuit 5 in series. At least one input signal $V_{in}$ is input to the input layer 2 of the neural network circuit 1. Note that in FIG. 2A, the at least one input signal $V_{in}$ represents a plurality of input signals $V_{in}^A$, $V_{in}^B$, . . . . The input layer 2 of the neural network circuit 1 includes at least one input signal terminal 6. Note that in FIG. 2A, the at least one input signal terminal 6 represents input signal terminals 6A, 6B, . . . . The at least one input signal $V_{in}$ is input from the at least one input signal terminal 6. In FIG. 2A, the input signal $V_{in}^A$ is input from the input signal terminal 6A, and the input signal $V_{in}^B$ is input from the input signal terminal 6B. At least one teaching signal $V_t$ is input to the input layer 2 of the neural network circuit 1. Note that in FIG. 2A, the at least one teaching signal $V_t$ represents teaching signals $V_t^a$, $V_t^b$, . . . . The input layer 2 of the neural network circuit 1 includes at least one teaching signal terminal 7. Note that in FIG. 2A, the at least one teaching signal terminal 7 represents teaching signal terminals 7a, 7b, . . . . The at least one teaching signal $V_t$ is input from the teaching signal terminal 7. In FIG. 2A, the teaching signal $V_t^a$ is input from the teaching signal terminal 7a, and the teaching signal $V_t^b$ is input from the teaching signal terminal 7b. The neural network circuit 1 is a circuit that obtains at least one output signal $V_{out}$ output from at least one output signal terminal 8 on the basis of the input signal $V_{in}$ input to the at least one input signal terminal 6. At least one output signal $V_{out}$ is output from the output layer 4 of the neural network circuit 1. Note that in FIG. 2A, the at least one output signal $V_{out}$ represents a plurality of output signals $V_{out}^a$, $V_{out}^b$, . . . . The output layer 4 of the neural network circuit 1 includes at least one output signal terminal 8. Note that in FIG. 2A, the at least one output signal terminal 8 represents output signal terminals 8a, 8b, . . . . The at least one output signal $V_{out}$ is output from the at least one output signal terminal 8. Note that in FIG. 2A, the output signal $V_{out}^a$ is output from the output signal terminal 8a, and the output signal $V_{out}^b$ is output from the output signal terminal 8b.

Figure 2B:
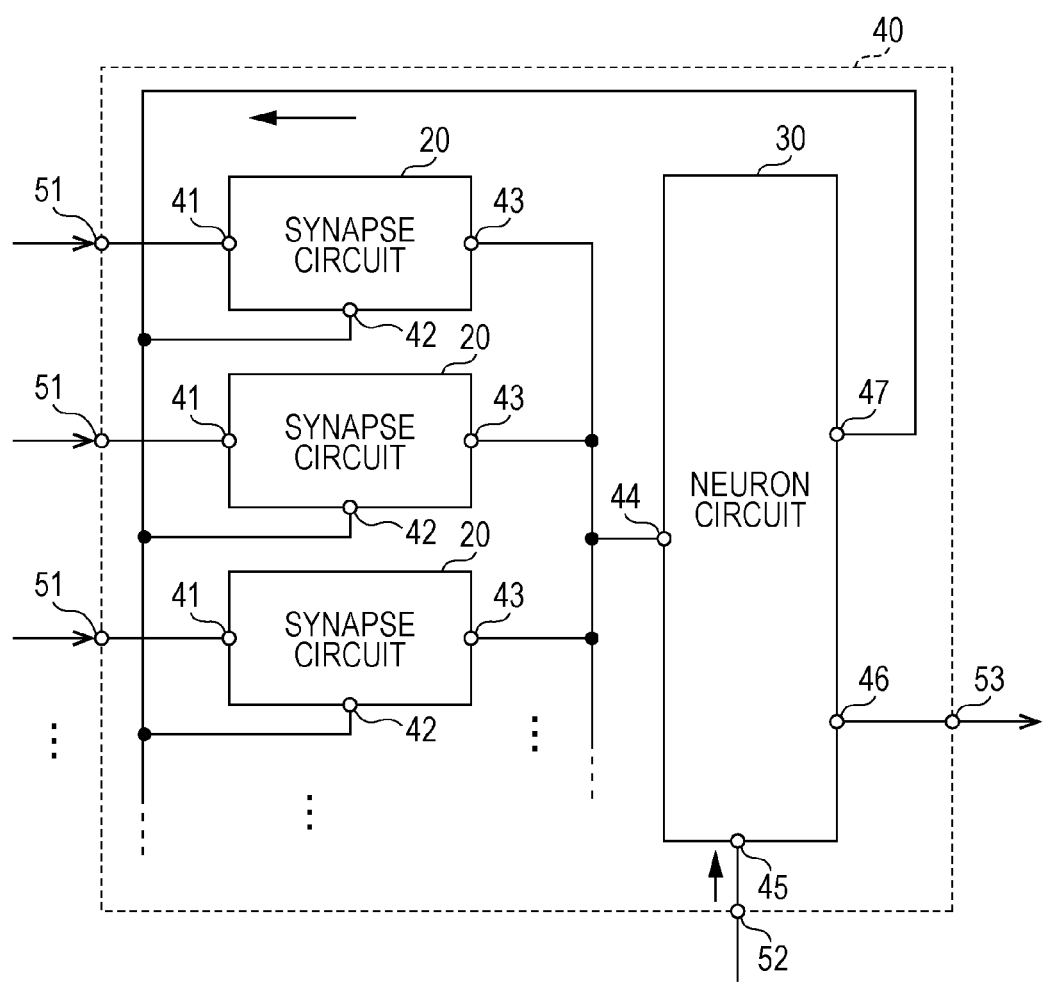
FIG. 2B is a block diagram of the neural network circuit element that forms the neural network circuit of FIG. 1 according to an exemplary embodiment of the present disclosure.
Figure 3A:
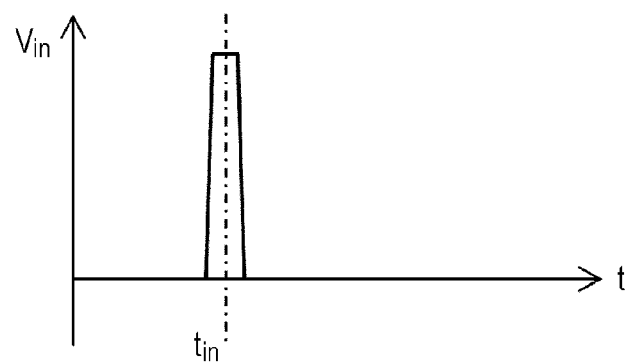
FIG. 3A illustrates an example of a waveform of a pulse voltage used as an input signal input to the neural network circuit element illustrated in FIG. 1.
Figure 3B:
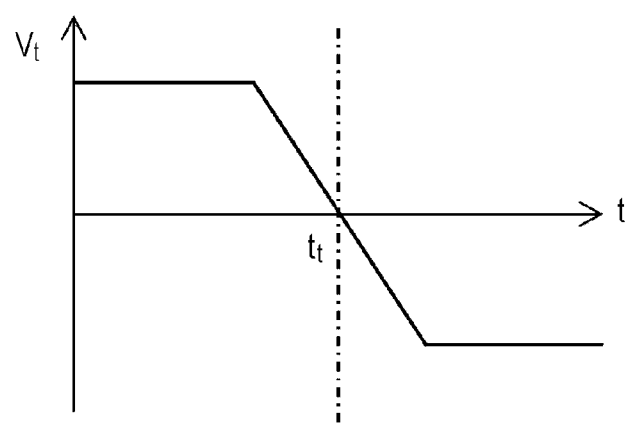
FIG. 3B illustrates an example of a waveform of an analog pulse voltage used as a teaching signal input to the neural network circuit element illustrated in FIG. 1.

FIG. 3A illustrates an example of a waveform of a pulse voltage used as the input signal input to the neural network circuit illustrated in FIG. 2A. FIG. 3B illustrates an example of a waveform of an analog pulse voltage used as a teaching signal input to the neural network circuit illustrated in FIG. 2A. The input signal $V_{in}$ input from the input signal terminal 6 is configured as a switching pulse voltage signal having a waveform of a predetermined shape that determines a predetermined duration, as illustrated in, for example, FIG. 3A. The teaching signal $V_t$ input from the teaching signal terminal 7 is configured as a weight change pulse voltage signal having a waveform illustrated in, for example, FIG. 3B. For example, as illustrated in FIG. 3B, the teaching signal $V_t$ has a reference potential (e.g., zero potential) when a time difference between the teaching signal $V_t$ and the output signal $V_{out}$ is zero. When the time difference between the teaching signal $V_t$ and the output signal $V_{out}$ is within a predetermined range and the center potential of this bipolar signal is set to the reference potential, the potential difference of the teaching signal $V_t$ from the center potential increases with increasing time difference. In contrast, when the time difference between the teaching signal $V_t$ and the output signal $V_{out}$ is outside the predetermined range, the amplitude of the teaching signal $V_t$ is maintained at the maximum value of the potential difference obtained in the predetermined range. In an example of FIG. 3B, as such a bipolar signal, a signal is illustrated so that if the time of the signal is ahead of a time $t_r$ at which the reference potential is provided (if an arrival time of the output signal $V_{out}$ is ahead of the teaching signal $V_t$), the teaching signal $V_t$ has a positive polarity (a positive value). However, if the time of the signal is behind the time $t_r$ (if the arrival time of the output signal $V_{out}$ is behind the teaching signal $V_t$), the teaching signal $V_t$ has a negative polarity (a negative value). Note that the positive polarity and the negative polarity of the teaching signal $V_t$ may be reversed.

In addition, the neural network circuit 1 includes the at least one output signal terminal 8 for obtaining the at least one output signal $V_{out}$ for the at least one input signal $V_{in}$. Note that in FIG. 2A, a plurality of the output signals are identified by the reference symbols $V_{out}^a$, $V_{out}^b$, . . . , and a plurality of the output signal terminals are identified by the reference symbols 8a, 8b, . . . . The number of all the teaching signal terminals (7a, 7b, . . . ) of the neural network circuit 1 is the same as the number of all the output signal terminals (8a, 8b, . . . ) of the neural network circuit 1. Note that the number of all the input signal terminals (6A, 6B, . . . ) of the neural network circuit 1 need not be the same as the number of all the output signal terminals (8a, 8b, . . . ) of the neural network circuit 1.

As illustrated in FIG. 2A, each of the intermediate layer 3 and the output layer 4 includes a plurality of neural network circuit elements 40 (refer to FIG. 1). As illustrated in FIG. 1, each of the neural network circuit elements 40 includes at least one synapse circuit 20 and a neuron circuit 30. An input terminal 51 of the neural network circuit element 40 included in the intermediate layer 3 is connected to an input signal terminal of the input layer 2 and receives the input signal. The neural network circuit element 40 included in the intermediate layer 3 outputs a switching pulse voltage signal $V_{POST2}$ generated by the neuron circuit 30 from an output terminal 53. The input terminal 51 of the neural network circuit element 40 included in the output layer 4 is connected to the output terminal 53 of the neural network circuit element 40 included in the intermediate layer 3 and receives the switching pulse voltage signal $V_{POST2}$ output from the neural network circuit element 40 included in the intermediate layer 3. The output terminal 53 of the neural network circuit element 40 included in the output layer 4 is connected to the output signal terminal 8 and outputs the switching pulse voltage signal $V_{POST2}$ generated by the neuron circuit 30 as the output signal $V_{out}$.

While the present exemplary embodiment has been described with reference to the neural network circuit elements 40 included in the intermediate layer 3 that are connected in parallel, a plurality of the neural network circuit elements 40 in the intermediate layer 3 may be connected in series. That is, a plurality of the intermediate layers 3 illustrated in FIG. 1 may be provided. In such a case, the input terminal 51 of the neural network circuit element 40 included in the intermediate layer 3 is connected to the input signal terminal of the input layer 2 or the output terminal 53 of the neural network circuit element 40 of the upstream neural network circuit element 40. The output terminal 53 is connected to the input terminal 51 of the downstream neural network circuit element 40 or the output signal terminal 8 of the neural network circuit 1.

In addition, each of the neural network circuit elements 40 includes an error input terminal 52 that receives a signal based on an error voltage signal $V_{error}$ (described in more detail below).

The synapse circuit 20 includes a first input terminal 41 connected to the input terminal 51 of the neural network circuit element 40, a second input terminal 42 connected to a first output terminal 47 (described in more detail below) of the neuron circuit 30, and an output terminal 43. The neuron circuit 30 includes a first input terminal 44 connected to the output terminal 43 of the synapse circuit 20, a second input terminal 45 connected to the error input terminal 52 of the neural network circuit elements 40, the first output terminal 47 connected to the second input terminal 42 of the synapse circuit 20, and a second output terminal 46 connected to the output terminal 53 of the neural network circuit elements 40. Note that in FIG. 1, for ease of understanding, only one neuron circuit 30 and only one synapse circuit 20 are illustrated. However, in reality, as illustrated in FIG. 2B, a plurality of the synapse circuits 20 can be connected to one neuron circuit 30.

Neuron Circuit

The neuron circuit 30 includes an integration circuit 31, a comparator circuit 32, and a waveform generating circuit 33.

Figure 4:
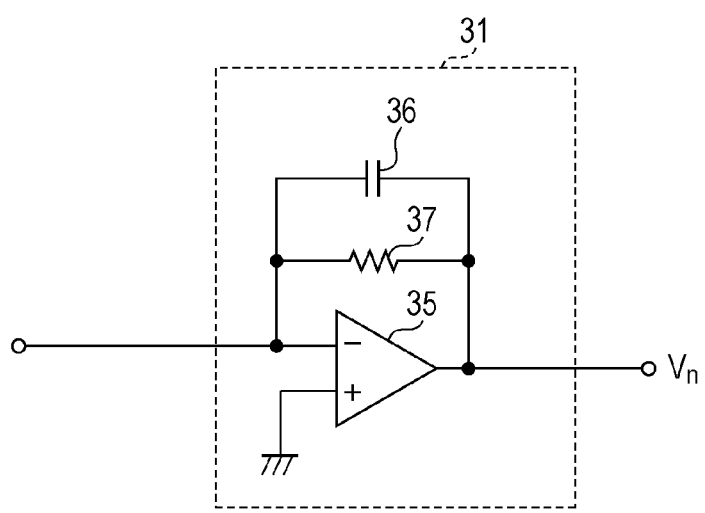
FIG. 4 is a circuit diagram of a particular example of an integration circuit in the neural network circuit element illustrated in FIG. 1.

The first input terminal 44 of the neuron circuit 30 is connected to the integration circuit 31. The integration circuit 31 calculates the sum of electric currents output from at least one synapse circuit 20 connected to the neuron circuit 30. FIG. 4 is a circuit diagram of a particular example of the integration circuit in the neural network circuit element illustrated in FIG. 1. In the particular example illustrated in FIG. 4, the integration circuit 31 is configured as an analog integration circuit including an operational amplifier 35, a capacitor 36, and a resistive element 37. The capacitance value of the capacitor 36 is, for example, 1 pF, and the resistance value of the resistive element 37 is, for example, 1 MΩ. The positive input terminal (+) of the operational amplifier 35 is configured so as to have a potential that is the same as a ground voltage. The negative input terminal (−) of the operational amplifier 35 is connected to the first input terminal 44 of the neuron circuit 30. The capacitor 36 and the resistive element 37 are connected in parallel between the negative input terminal (−) of the operational amplifier 35 and the output terminal.

The integration circuit 31 charges the capacitor 36 using an electric current input from the synapse circuit 20 to the neuron circuit 30. As a result of the operation, the result of calculation of the time integral of the electric current is output as an integrated voltage signal $V_n$. In addition, the operational amplifier 35 is configured so as to feed back the integrated voltage signal $V_n$ to the negative input terminal (−) of the operational amplifier 35 via the resistive element 37. In this manner, the negative input terminal (−) of the operational amplifier 35 enters a virtual ground mode.

Since the negative input terminal (−) of the operational amplifier 35 enters a virtual ground mode, a constant electric current determined by a first reference voltage $V_1$ of an electric current voltage source 23 and the resistance value of a variable resistive element 10 regardless of the number of the synapse circuits 20 and an integrated potential $V_n$ of the capacitor 36 is input to the neuron circuit 30 and is accumulated in the neuron circuit 30.

The integrated potential $V_n$ of the integration circuit 31 is input to the comparator circuit 32. The comparator circuit 32 outputs an output signal (a trigger signal) $V_t$ to the waveform generating circuit 33 if the calculated value exceeds a predetermined threshold value $V_{TH}$.

The waveform generating circuit 33 generates a weight change pulse voltage signal $V_{POST1}$ and the switching pulse voltage signal $V_{POST2}$. The weight change pulse voltage signal $V_{POST1}$ has a predetermined first waveform that starts as triggered by an output signal $V_C$ of the comparator circuit 32. The first waveform increases from the reference value to a predetermined peak value and, thereafter, the first waveform returns from the peak value to the reference value as time passes. The switching pulse voltage signal $V_{POST2}$ has a predetermined second waveform that determines the predetermined duration. The weight change pulse voltage signal $V_{POST1}$ is output from the first output terminal 47, and the switching pulse voltage signal $V_{POST2}$ is output from the second output terminal 46.

Figure 5A:
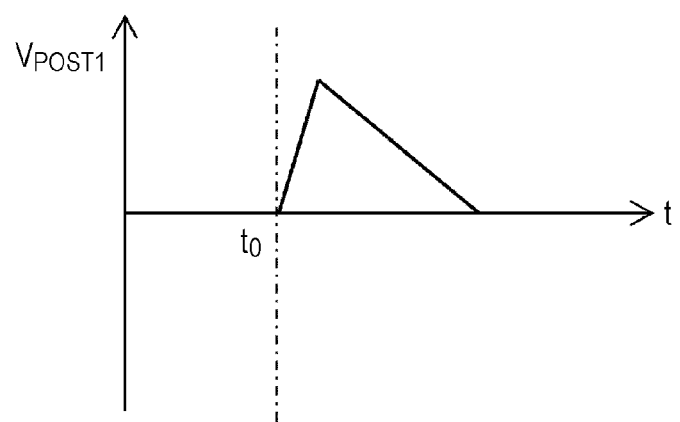
FIG. 5A illustrates an example of the waveform of a weight change pulse voltage signal used by the neural network circuit element illustrated in FIG. 1.
Figure 5B:
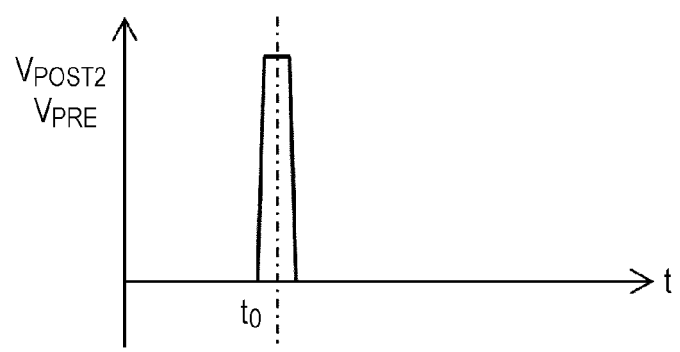
FIG. 5B illustrates an example of the waveform of a switching pulse voltage signal used by the neural network circuit element illustrated in FIG. 1.

FIG. 5A illustrates an example of the waveform of a weight change pulse voltage signal used by the neural network circuit element illustrated in FIG. 1. FIG. 5B illustrates an example of the waveform of a switching pulse voltage signal used by the neural network circuit element illustrated in FIG. 1.

As illustrated in FIG. 5A, the weight change pulse voltage signal $V_{POST1}$ has the first waveform. The first waveform is an analog pulse voltage signal having a triangular waveform that rises from zero potential, which is a reference value, to a predetermined positive peak voltage and, thereafter, falls from the positive peak value to zero potential as time passes. Note that instead of the waveform illustrated in FIG. 5A, the weight change pulse voltage signal $V_{POST1}$ may have, for example, a waveform obtained by reversing the sign of the waveform illustrated in FIG. 5A. Furthermore, in the example of FIG. 5A, the waveform having a potential that linearly increases and decreases as time passes is illustrated. However, the potential may non-linearly vary as time passes.

As illustrated in FIG. 5B, the switching pulse voltage signal $V_{POST2}$ has the second waveform that is a square wave. More specifically, the switching pulse voltage signal $V_{POST2}$ illustrated in FIG. 5B has the second waveform that rises to a predetermined voltage level or higher (an HI state) for the predetermined duration (a input allowed interval). Note that the waveform of the switching pulse voltage signal $V_{POST2}$ is not limited to that illustrated in FIG. 5B. The switching pulse voltage signal $V_{POST2}$ may have any waveform that can determine a time duration of the HI state or an LO state. Accordingly, the switching pulse voltage signal $V_{POST2}$ may be a digital waveform or an analog waveform. As described below, a switching pulse voltage signal $V_{PRE}$ input to a first input terminal 51 of the neural network circuit element 40 has a waveform that is similar to the waveform of the switching pulse voltage signal $V_{POST2}$.

The waveform generating circuit 33 generates the weight change pulse voltage signal $V_{POST1}$ and the switching pulse voltage signal $V_{POST2}$ at the same time. More specifically, the waveform generating circuit 33 outputs the weight change pulse voltage signal $V_{POST1}$ and the switching pulse voltage signal $V_{POST2}$ so that the time at which the potential of the weight change pulse voltage signal $V_{POST1}$ changes coincides with a temporal center point of the switching pulse voltage signal $V_{POST2}$ (indicated by a time $t_0$ in FIGS. 5A and 5B).

Figure 6:
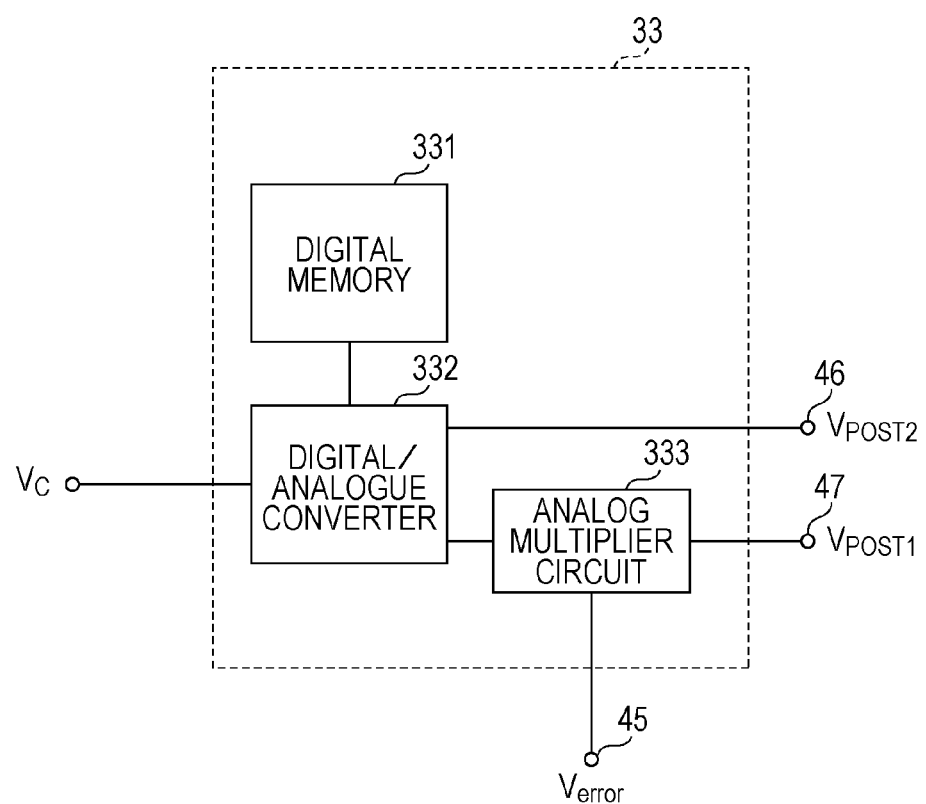
FIG. 6 is a block diagram illustrating an example of the signal generating circuit of a neuron circuit of the neural network circuit element illustrated in FIG. 1.

FIG. 6 is a block diagram illustrating an example of the signal generating circuit of a neuron circuit of the neural network circuit element illustrated in FIG. 1. As illustrated in FIG. 6, the waveform generating circuit 33 includes a digital/analog converter 332 that is driven as triggered by the output signal $V_t$ output from the comparator circuit 32, a digital memory 331 that stores digital waveform data used to generate an analog pulse voltage, and an analog multiplier circuit 333. Upon receiving the output signal $V_C$ from the comparator circuit 32, the digital/analog converter 332 reads out the digital waveform data of the first waveform from the digital memory 331, converts the digital waveform data into an analog waveform, and inputs the analog waveform to the analog multiplier circuit 333. The analog multiplier circuit 333 multiplies the magnitude of the first waveform in the digital memory 331 by the magnitude of the error voltage signal $V_{error}$ input from the second input terminal 45 to generate an analog waveform having the amplitude obtained through the multiplication as the weight change pulse voltage signal $V_{POST1}$. The generated weight change pulse voltage signal $V_{POST1}$ is output from the first output terminal 47. As illustrated in FIG. 1, the weight change pulse voltage signal $V_{POST1}$ output from the first output terminal 47 is fed back to all the synapse circuits 20 in the neural network circuit element 40 including the neuron circuit 30 that output the weight change pulse voltage signal $V_{POST1}$ (refer to FIG. 2B).

In addition, the waveform generating circuit 33 generates the switching pulse voltage signal $V_{POST2}$ and outputs the switching pulse voltage signal $V_{POST2}$ to the second output terminal 46. As described above, the second output terminal 46 of the neuron circuit 30 is connected to the output terminal 53 of the neural network circuit element 40. Accordingly, the switching pulse voltage signal $V_{POST2}$ serves as the output signal of the neural network circuit element 40. The output signal of the neural network circuit element 40 included in the intermediate layer 3 is input to the first input terminal 51 of the neural network circuit element 40 other than the neural network circuit element 40 including the neuron circuit 30 that output the output signal (the neural network circuit element 40 included in the output layer 4) as the first input signal (i.e., the switching pulse voltage signal $V_{PRE}$ described below). The output signal of the neural network circuit element 40 included in the output layer 4 serves as the output signal $V_{out}$ output from the output signal terminal 8 of the neural network circuit 1.

Synapse Circuit

The synapse circuit 20 according to the present exemplary embodiment is described next. As illustrated in FIG. 1, the synapse circuit 20 includes the variable resistive element 10 having a resistance value that varies when a pulse voltage is applied. The synapse circuit 20 is configured so as to change, for the predetermined duration of the switching pulse voltage signal $V_{PRE}$ input to the first input terminal 41, the resistance value of the variable resistive element 10 of the synapse circuit 20 by using a voltage in accordance with a time difference between the switching pulse voltage signal $V_{PRE}$ and the weight change pulse voltage signal $V_{POST1}$ input to the second input terminal 42. Note that the switching pulse voltage signal $V_{PRE}$ is the switching pulse voltage signal $V_{POST2}$ input from the neural network circuit element 40 other than the neural network circuit element 40 including the synapse circuit 20 to which the switching pulse voltage signal $V_{PRE}$ is input. Alternatively, the switching pulse voltage signal $V_{PRE}$ is the input signal $V_{in}$ input from the input signal terminal 6. In addition, the weight change pulse voltage signal $V_{POST1}$ is a weight change pulse voltage signal $V_{POST1}$ generated by the neuron circuit 30 of the neural network circuit element 40 including the synapse circuit 20 to which the weight change pulse voltage signal $V_{POST1}$ is input.

The variable resistive element 10 includes a first terminal 13, a second terminal 14, and a third terminal 15. A constant voltage based on the switching pulse voltage signal $V_{PRE}$ is applied between the first terminal 13 and the second terminal 14. A voltage determined in accordance with a time difference between the switching pulse voltage signal $V_{PRE}$ and the weight change pulse voltage signal $V_{POST1}$ is applied between the first terminal 13 and the third terminal 15 for the predetermined duration of the switching pulse voltage signal $V_{PRE}$ (the input allowed interval). In the variable resistive element 10, the resistance value between the first terminal 13 and the second terminal 14 varies in accordance with the potential difference between the first terminal 13 and the third terminal 15 generated in this manner.

Note that a nonvolatile variable resistive element can be used as the variable resistive element 10. As used herein, the term "nonvolatile" refers to a property that allows the resistance value changed by applying a voltage to the variable resistive element 10 to be maintained after the application of the voltage stops. By using the variable resistive element 10 having such a property, the resistance value can be maintained even after application of voltage to the variable resistive element 10 stops.

Figure 7A:
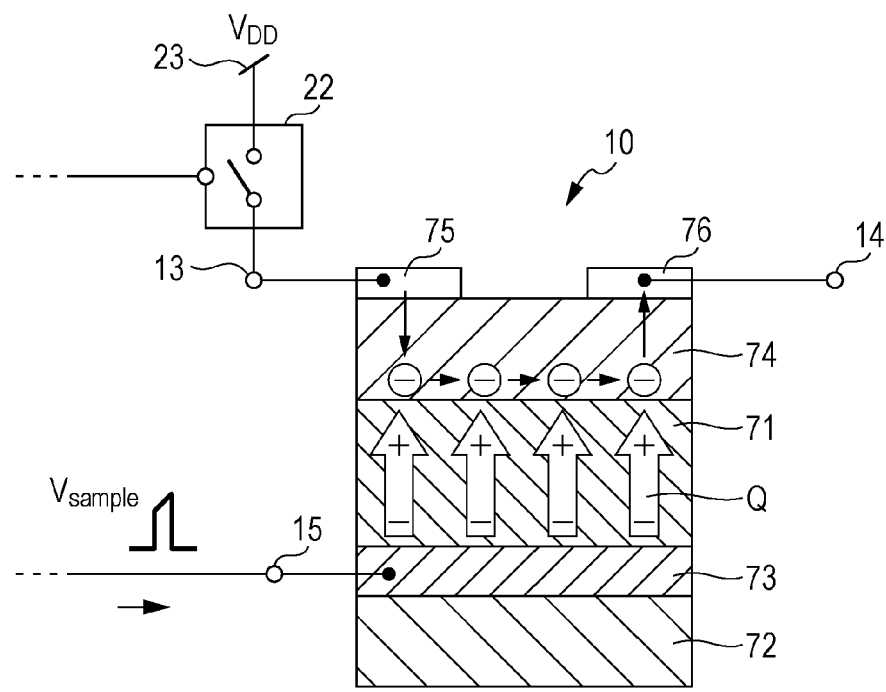
FIG. 7A is a cross-sectional view schematically illustrating a particular example of a variable resistive element of the neural network circuit element illustrated in FIG. 1.
Figure 7B:
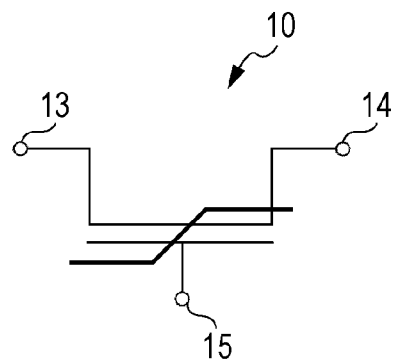
FIG. 7B illustrates circuit symbols of the variable resistive element illustrated in FIG. 7A.

According to the present exemplary embodiment, a ferroelectric memristor is used as the variable resistive element 10. FIG. 7A is a cross-sectional view schematically illustrating a particular example of the variable resistive element of the neural network circuit element illustrated in FIG. 1. FIG. 7B illustrates the circuit symbols of the variable resistive element illustrated in FIG. 7A.

As illustrated in FIG. 7A, the ferroelectric memristor has a field effect transistor structure including a gate insulating layer serving as a ferroelectric layer 71 (the ferroelectric memristor is also referred to as a "ferroelectric gate transistor"). The ferroelectric memristor includes a control electrode (a gate electrode) 73 formed on a substrate 72, a ferroelectric layer 71 formed to be in contact with the control electrode 73, a semiconductor layer 74 formed on the ferroelectric layer 71, and a first electrode (a source electrode) 75 and a second electrode (a drain electrode) 76 formed on the semiconductor layer 74. The first electrode 75 is connected to the first terminal 13. The second electrode 76 is connected to the second terminal 14. The control electrode 73 is connected to the third terminal 15. In the variable resistive element 10 having such a structure, the resistance value between the first electrode 75 and the second electrode 76 varies in accordance with the potential difference between the first electrode 75 and the control electrode 73.

The semiconductor layer 74 is formed of, for example, ZnO, GaN, or InGaZnO. The ferroelectric layer 71 is formed of, for example, Pb(Zr, Ti)O$_3$, Sr(Bi, Ta)O, or Bi$_{12}$TiO$_{20}$. Each of the first electrode 75, the second electrode 76, and the control electrode 73 is formed from, for example, a laminated body including a platinum layer and a titanium layer.

If a voltage is applied between the control electrode 73 and one/both of the first electrode 75 and the second electrode 76 of the ferroelectric memristor, the resistance value between the first electrode 75 and the second electrode 76 varies in a nonvolatile manner due to the direction of polarization of the ferroelectric layer 71 (indicated by arrows Q in FIG. 7A).

This mechanism is described in more detail. In the following description, a direction from the control electrode 73 to the semiconductor layer 74 is defined as an upward direction, and a direction from the semiconductor layer 74 to the control electrode 73 is defined as a downward direction. As illustrated in FIG. 7A, if part of the ferroelectric layer 71 has polarization in the upward direction (polarization indicated by the arrows Q in FIG. 7A), the semiconductor layer 74 stacked on the portion of the ferroelectric layer 71 having polarization formed therein has a low resistance value. In contrast, if part of the ferroelectric layer 71 has polarization in the downward direction (polarization in a direction that is opposite to the direction indicated by the arrows Q in FIG. 7A), the semiconductor layer 74 stacked on the portion of the ferroelectric layer 71 having polarization formed therein has a high resistance value. The resistance value between the first electrode 75 and the second electrode 76 is the same as the resistance value of a region of the semiconductor layer 74 sandwiched by the first electrode 75 and the second electrode 76. Accordingly, the resistance value between the first electrode 75 and the second electrode 76 continuously varies in accordance with the percent of polarization of the ferroelectric layer 71 located under the region of the semiconductor layer 74.

In the ferroelectric memristor having such structure, to control the resistance value between the first electrode 75 and the second electrode 76, the polarization direction of the ferroelectric layer 71 is changed by changing a potential difference between the control electrode 73 and one/both of the first electrode 75 and the second electrode 76. For example, if a positive voltage is applied to the control electrode 73 with respect to the first electrode 75 and/or the second electrode 76, the direction of the electric field caused by polarization of the ferroelectric layer 71 can be easily directed upward (toward the semiconductor layer 74). In contrast, if a negative voltage is applied to the control electrode 73, the direction of the electric field caused by polarization of the ferroelectric layer 71 can be easily directed downward (toward the control electrode 73). In addition, an amount of change in polarization of the ferroelectric layer 71 increases with increasing voltage (the absolute value) applied. Accordingly, if a positive voltage is applied to the control electrode 73, the resistance value between the first electrode 75 and the second electrode 76 decreases. In contrast, if a negative voltage is applied to the control electrode 73, the resistance value between the first electrode 75 and the second electrode 76 increases. Furthermore, a change in the resistance value between the first electrode 75 and the second electrode 76 is more significant with increasing absolute value of the voltage applied to the control electrode 73. As described above, a ferroelectric memristor can be used as the above-described variable resistive element 10.

An example of a method for manufacturing the above-described ferroelectric memristor is described. An oxide conductor layer made of, for example, strontium ruthenate (SrRuO$_3$) is deposited on the single-crystal substrate 72 made of, for example, strontium titanate (SrTiO$_3$) and having (001) alignment using a pulsed laser deposition technique (hereinafter referred to as a "PLD technique") first. The thickness of the oxide conductor layer is, for example, 30 nm. In addition, the temperature of the substrate 72 during deposition is 700° C. After the oxide conductor layer is deposited, the control electrode 73 is formed by using a photolithography technique and an ion milling technique.

Thereafter, the ferroelectric layer 71 made of, for example, lead zirconate titanate (Pb(Zr, Ti)O$_3$) is deposited on the control electrode 73 using a PLD technique with the substrate 72 at a temperature of 700° C. The thickness of the ferroelectric layer 71 is, for example, 450 nm. Subsequently, the temperature of the substrate 72 is decreased to 400° C., and the semiconductor layer 74 made of, for example, zinc oxide (ZnO) is deposited on the ferroelectric layer 71. The thickness of the semiconductor layer 74 is, for example, 450 nm.

Subsequently, a resist for patterning is formed on the deposited semiconductor layer 74. Thereafter, for example, a titanium layer and a platinum layer are deposited by an electron-beam evaporation technique at a room temperature to form a laminated body including the titanium layer and the platinum layer. The thickness of the titanium layer is, for example, 5 nm, and the thickness of the platinum layer is, for example, 30 nm. After the laminated body is formed, the first electrode 75 and the second electrode 76 are formed by a lift-off technique. The first electrode 75 and the second electrode 76 are in contact with the principal surface of the semiconductor layer 74. The first electrode 75 is separated from the second electrode 76 by a predetermined distance. In this manner, the variable resistive element 10 formed as a ferroelectric memristor is obtained.

To change the resistance value of the variable resistive element 10, the following configuration, for example, is employed. That is, the synapse circuit 20 includes a first switch 21 that connects and disconnects the third terminal 15 of the variable resistive element 10 from the second input terminal 42 to which the weight change pulse voltage signal V$_{POST1}$ is input. The first switch 21 connects and disconnects the third terminal 15 of the variable resistive element 10 from the second input terminal 42 on the basis of the switching pulse voltage signal V$_{PRE}$ input from the first input terminal 51.

For example, the switching pulse voltage signal V$_{PRE}$ has a waveform that is higher than or equal to a predetermined voltage level (a HI state) for the predetermined duration (an input allowed interval). For the duration of the switching pulse voltage signal V$_{PRE}$ being in the HI state, the third terminal 15 of the variable resistive element 10 is connected to the second input terminal 42 of the synapse circuit 20 by the first switch 21. That is, for the duration of the switching pulse voltage signal V$_{PRE}$ being in the HI state, the first switch 21 enters a closed state so that the second input terminal 42 of the synapse circuit 20 and the third terminal 15 of the variable resistive element 10 are electrically conductive with each other. Accordingly, for the input allowed interval determined on the basis of the switching pulse voltage signal $V_{PRE}$, the third terminal 15 of the variable resistive element 10 is connected to the second output terminal 46 of the neuron circuit 30 that outputs the weight change pulse voltage signal $V_{POST1}$. For the other interval, the third terminal 15 is disconnected from the second output terminal 46.

In addition, the synapse circuit 20 includes a first reference voltage source 23 that generates the predetermined first reference voltage $V_1$ (e.g., a power supply voltage $V_{DD}$) and a second switch 22 having one end connected to the first reference voltage source 23 and the other end connected to the first terminal 13 of the variable resistive element 10. For the predetermined duration (the input allowed interval) of the switching pulse voltage signal $V_{PRE}$ input from another neural network circuit element 40 or the input signal terminal 6, the switching pulse voltage signal $V_{PRE}$ is higher than or equal to, for example, the predetermined voltage level (the HI state). At that time, the second switch 22 connects the first reference voltage source 23 to the first terminal 13. In addition, the synapse circuit 20 includes a delay circuit 29 that delays the switching pulse voltage signal $V_{PRE}$ by a predetermined period of time.

One end of the delay circuit 29 is connected to the first input terminal 41 of the synapse circuit 20, and the other end is connected to a control terminal 26 of the first switch 21 and a control terminal 18 of the second switch 22. A terminal 27, which is one of two main terminals of the first switch 21, is connected to the second input terminal 42, and a terminal 28, which is the other main terminal, is connected to the third terminal 15 of the variable resistive element 10. The first switch 21 connects the main terminals 27 and 28 to each other if a voltage higher than or equal to a predetermined voltage is applied to the control terminal 26. A terminal 16, which is one of two main terminals of the second switch 22, is connected to the first reference voltage source 23, and a terminal 17, which is the other main terminal, is connected to the first terminal 13 of the variable resistive element 10. The second switch 22 connects the main terminals 16 and 17 to each other if a voltage higher than or equal to a predetermined voltage is applied to the control terminal 18. The second terminal 14 of the variable resistive element 10 is connected to the output terminal 43.

In such a configuration, the switching pulse voltage signal $V_{PRE}$ input from the first input terminal 51 of the neural network circuit element 40 is input to the control terminal 26 of the first switch 21 and the control terminal 18 of the second switch 22. Accordingly, the first switch 21 connects the main terminals 27 and 28 to each other for the predetermined duration (a HI state duration) of the switching pulse voltage signal $V_{PRE}$ and disconnects the main terminals 27 and 28 from each other for the other duration (a LO state duration). Similarly, the second switch 22 connects the main terminals 16 and 17 to each other for the predetermined duration (a HI state duration) of the switching pulse voltage signal $V_{PRE}$ and disconnects the main terminals 16 and 17 from each other for the other duration (a LO state duration).

Figure 8:
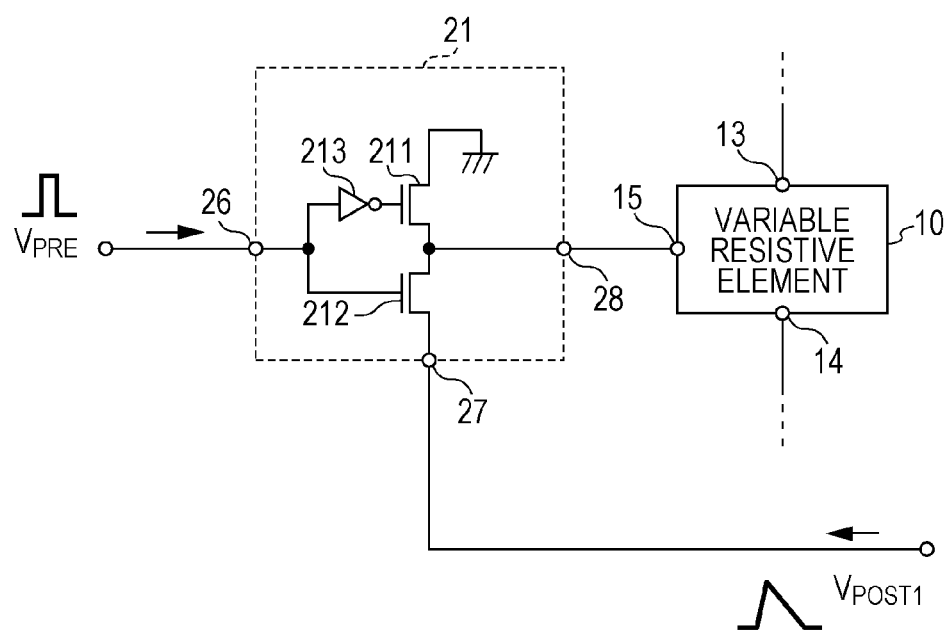
FIG. 8 is a circuit diagram illustrating a particular example of a first switch of a synapse circuit of the neural network circuit element illustrated in FIG. 1.

FIG. 8 is a circuit diagram illustrating a particular example of the first switch of a synapse circuit of the neural network circuit element illustrated in FIG. 1. In the particular example of FIG. 8, the first switch 21 is formed from at least two transistors that operate in complementary mode. In the example illustrated in FIG. 8, the first switch 21 includes two n-type MOSFETs 211 and 212 and an inverter 213. A source terminal of the n-type MOSFET 211 is provided with a predetermined reference voltage (e.g., a ground voltage). A drain terminal of the n-type MOSFET 211 is connected to a source terminal of the n-type MOSFET 212. A gate terminal of the n-type MOSFET 211 is connected to an output terminal of the inverter 213. A drain terminal of the n-type MOSFET 212 is connected to the terminal 27, which is one of the two main terminals. A gate terminal of the n-type MOSFET 212 is connected to the control terminal 26, and an input terminal of the inverter 213 is also connected to the control terminal 26. A common terminal of the n-type MOSFETs 211 and 212 is connected to the terminal 28, which is the other main terminal. Note that instead of using the inverter 213, the n-type MOSFET 211, which is one of the two n-type MOSFETs 211 and 212, may be changed to a p-type MOSFET.

As described above, the terminal 27, which is one of two main terminals, receives the weight change pulse voltage signal $V_{POST1}$ output from the second output terminal 46 of the neuron circuit 30 disposed in the neural network circuit element 40 having the first switch 21. In addition, the control terminal 26 receives the switching pulse voltage signal $V_{PRE}$ input from the outside of the neural network circuit element 40 having the first switch 21.

In such a configuration, for the duration of the switching pulse voltage signal $V_{PRE}$ applied to the control terminal 26 being in the HI state, the n-type MOSFET 211 enters an open state (a disconnected state) and the n-type MOSFET 212 enters a closed state (a connected state). Accordingly, a voltage value determined in accordance with the voltage value of the weight change pulse voltage signal $V_{POST1}$ serves as the output voltage of the terminal 28, which is the other main terminal. In contrast, for the duration of the switching pulse voltage signal $V_{PRE}$ being in the LO state, the n-type MOSFET 211 enters a closed state (a connected state) and the n-type MOSFET 212 enters an open state (a disconnected state). Accordingly, the output voltage of the terminal 28 is the same as the reference voltage (a voltage that is substantially the same as the ground potential applied to the source terminal of the n-type MOSFET 211).

The second switch 22 can be formed by using, for example, a field effect transistor (FET). In such a case, the gate terminal of the FET functions as the control terminal 18.

In the synapse circuit 20 having such a configuration, the switching pulse voltage signal $V_{POST2}$ output from another neural network circuit element 40 is applied to the first input terminal 41 as the first input signal, that is, the switching pulse voltage signal $V_{PRE}$. In addition, the weight change pulse voltage signal $V_{POST1}$ output from the neuron circuit 30 in the same neural network circuit element 40 is applied to the second input terminal 42 of the synapse circuit 20.

Processing Function and Learning Function of Neural Network Circuit Element

As described above, the variable resistive element 10 has a characteristic that varies the resistance value between the first terminal 13 and the second terminal 14. By setting the second switch 22 in the closed state, the first reference voltage $V_1$ is applied between the first terminal 13 and the second terminal 14 of the variable resistive element 10. Thus, an electric current that is proportional to the present electrical conductance (the inverse of the resistance value) of the variable resistive element 10 flows from the first reference voltage source 23 to the variable resistive element 10. This electric current is input to the neuron circuit 30. The magnitude of electrical current input to the neuron circuit 30 is proportional to a synapse connection weight w, which corresponds to the PSP ($P_1(t)$, $P_2(t)$) illustrated in FIG. 18.

As described above, according to the present exemplary embodiment, the electrical conductance (the inverse of the resistance value) of the variable resistive element 10 corresponds to the synapse connection weight w.

The electric currents input from a plurality of the synapse circuits 20 to the neuron circuit 30 are asynchronously given by the plurality of the synapse circuits 20 included in the neural network circuit element 40 that includes the neuron circuit 30. The integration circuit 31 obtains the spatio-temporal sum of the input currents from the synapse circuits 20. The integration voltage caused by the spatio-temporal sum is considered as the above-described internal potential $V_n$ of the neuron. If the internal potential $V_n$ exceeds a predetermined threshold voltage $V_{TH}$, the waveform generating circuit 33 generates two pulse voltages ($V_{POST1}$, $V_{POST2}$). The switching pulse voltage signal $V_{POST2}$ output from the neuron circuit 30 of the neural network circuit element 40 included in the intermediate layer 3 is applied to the first input terminal 51 of the synapse circuit 20 of the neural network circuit element 40 included in the output layer 4 as the switching pulse voltage signal $V_{PRE}$. In addition, the switching pulse voltage signal $V_{POST2}$ output from the neuron circuit 30 of the neural network circuit element 40 included in the output layer 4 is output from the output signal terminal 8 as the output signal $V_{out}$ of the neural network circuit.

If the switching pulse voltage signal $V_{POST2}$ output from the neural network circuit element 40 included in the intermediate layer 3 is input to the neural network circuit element 40 included in the output layer 4 as the first input signal (the switching pulse voltage signal $V_{PRE}$), the synapse circuit 20 of the neural network circuit element 40 included in the output layer 4 switches the first switch 21 on the basis of the value of the switching pulse voltage signal $V_{PRE}$. During the predetermined duration of the switching pulse voltage signal $V_{PRE}$, the first switch 21 connects the third terminal 15 of the variable resistive element 10 to the second input terminal 42 of the synapse circuit 20. Thus, the input allowed interval during which the weight change pulse voltage signal $V_{POST1}$ can be input to the third terminal 15 of the variable resistive element 10 occurs. During the input allowed interval, the weight change pulse voltage signal $V_{POST1}$ input to the second input terminal 42 is applied to the third terminal 15 of the variable resistive element 10. In this manner, a pulse voltage of the analog waveform pulse voltage signal $V_{POST1}$ having a waveform that temporally overlaps the switching pulse voltage signal $V_{PRE}$ (i.e., a pulse voltage having the predetermined duration) is applied to the third terminal 15 of the variable resistive element 10. The resistance value of the variable resistive element 10 is changed by the pulse voltage having the predetermined duration. As described above, according to the present exemplary embodiment, since the inverse of the resistance value (i.e., the electrical conductance) of the variable resistive element 10 represents the synapse connection weight, a "learning" operation that updates the synapse connection strength of the synapse circuit 20 using a change in the resistance value is available.

In addition, the waveform of the pulse voltage applied to the third terminal 15 of the variable resistive element 10 is changed by the timings at which the weight change pulse voltage signal $V_{POST1}$ and the switching pulse voltage signal $V_{PRE}$ are applied (a time difference). As described above, the amount of change in resistance value of the variable resistive element 10 depends on the magnitude of the applied voltage, that is, the waveform of the voltage. The waveform of the pulse voltage applied to the third terminal 15 of the variable resistive element 10 varies in accordance with the timings at which two pulse voltages are applied. Accordingly, the amount of change in resistance value of the variable resistive element 10 varies in accordance with the timings at which the weight change pulse voltage signal $V_{POST1}$ and the switching pulse voltage signal $V_{PRE}$ are applied.

Figure 9:
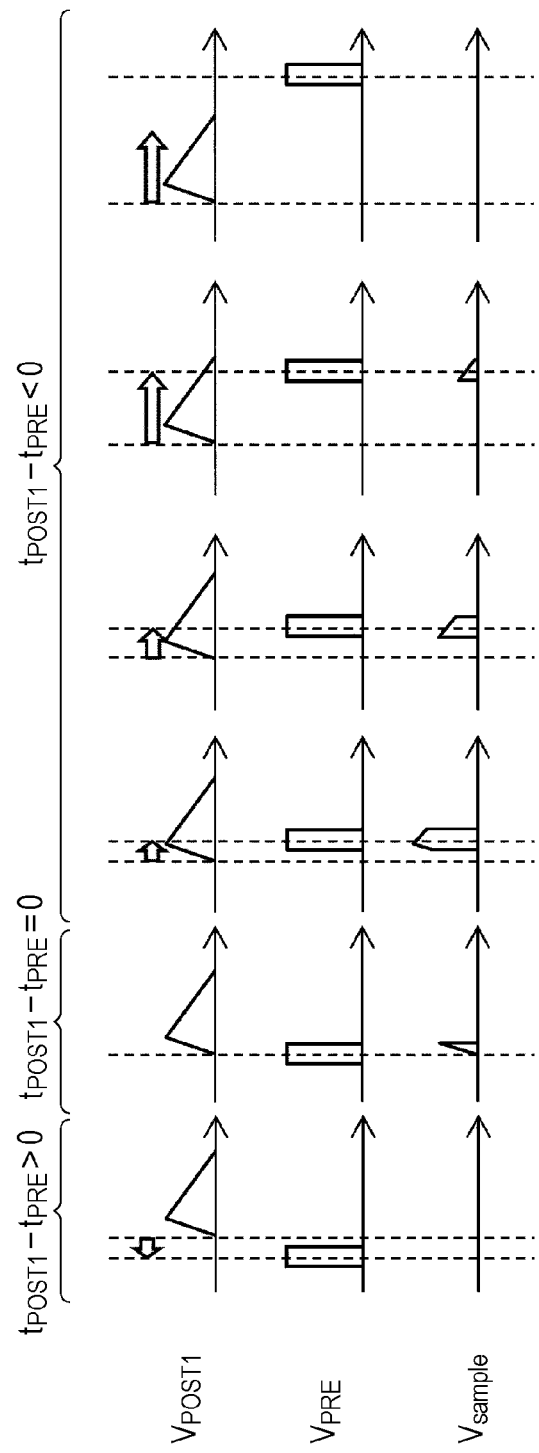
FIG. 9 is a graph illustrating a voltage applied to a third terminal of the variable resistive element in accordance with a time difference between the weight change pulse voltage signal illustrated in FIG. 5A and the switching pulse voltage signal illustrated in FIG. 5B.

FIG. 9 is a graph illustrating the voltage applied to the third terminal of the variable resistive element in accordance with a time difference between the weight change pulse voltage signal illustrated in FIG. 5A and the switching pulse voltage signal illustrated in FIG. 5B. As described above, the weight change pulse voltage signal $V_{POST1}$ is applied to the third terminal 15 of the variable resistive element 10 only when the switching pulse voltage signal $V_{PRE}$ is in the HI state. In FIG. 9, let $V_{sample}$ denote the voltage applied to the third terminal 15 of the variable resistive element 10 during the input allowed interval through the operation of the first switch 21 (hereinafter, the applied voltage is referred to as a "gate input voltage"). In addition, the time at which the potential of the weight change pulse voltage signal $V_{POST1}$ starts to change and the temporal center point of the switching pulse voltage signal $V_{POST2}$ (the time $t_0$ illustrated in FIGS. 5A and 5B) are considered as two reference points. Then, an input timing difference $t_{POST1}-t_{PRE}$ between the weight change pulse voltage signal $V_{POST1}$ and the switching pulse voltage signal $V_{PRE}$ is defined as a difference between the two reference points. Note that in FIG. 9, the difference between the two pulse voltage input timings is indicated by an arrow.

As illustrated in FIG. 9, if the input timing difference $t_{POST1}-t_{PRE}$ between the weight change pulse voltage signal $V_{POST1}$ and the switching pulse voltage signal $V_{PRE}$ varies, the waveform of the gate input voltage signal $V_{sample}$ varies. For example, when $t_{POST1}-t_{PRE}<0$ ($V_{POST1}$ is input earlier than $V_{PRE}$) and if the weight change pulse voltage signal $V_{POST1}$ temporally overlaps the switching pulse voltage signal $V_{PRE}$, the gate input voltage signal $V_{sample}$ becomes a voltage in the negative direction. The magnitude of the gate input voltage signal $V_{sample}$ increases with decreasing input timing difference until the input timing difference reaches a certain small value. As the magnitude of the gate input voltage signal $V_{sample}$ increases in the negative direction, the electrical conductance (the reverse of the resistance value) of the variable resistive element 10 significantly decreases. In contrast, when $t_{POST1}-t_{PRE}>0$ ($V_{POST1}$ is input later than $V_{PRE}$) and if the weight change pulse voltage signal $V_{POST1}$ temporally overlaps the switching pulse voltage signal $V_{PRE}$, the gate input voltage signal $V_{sample}$ becomes a voltage in the positive direction. The magnitude of the gate input voltage signal $V_{sample}$ increases with decreasing input timing difference until the input timing difference reaches a certain small value. As the magnitude of the gate input voltage signal $V_{sample}$ increases in the positive direction, the electric conductivity (the reverse number of the resistance value) of the variable resistive element 10 significantly increases. In a predetermined range in which the input timing difference $t_{POST1}-t_{PRE}$ is close to zero, the average of the gate input voltage signals $V_{sample}$ is close to substantially zero.

In this manner, by switching the first switch 21 using the switching pulse voltage signal $V_{PRE}$, the gate input voltage signal $V_{sample}$ that depends on the input timing difference between the analog pulse voltage $V_{POST1}$ generated in the same neural network circuit element 40 and the switching pulse voltage $V_{PRE}$ input from another neural network circuit element 40 is applied to the third terminal 15 of the variable resistive element 10 on the basis of the input timing difference. By using the gate input voltage signal $V_{sample}$ applied in this manner, modulation of the resistance value that depends on the input timing difference can be realized in the variable resistive element 10. According to the present exemplary embodiment, the resistance is changed in accordance with the pulse timing of the neural network circuit element 40 in the previous stage and the amplitude of a pulse that is changed by a feedback signal sent from the error calculating circuit 5 (described in more detail below). Accordingly, learning can be efficiently conducted.

Furthermore, the neural network circuit element 40 is configured so as to change the amplitude of the weight change pulse voltage signal $V_{POST1}$ output from the waveform generating circuit 33 of the neuron circuit 30 on the basis of the error voltage signal $V_{error}$ generated by the error calculating circuit 5.

According to such a configuration, by converting the time difference between the output signal $V_{out}$ and the teaching signal $V_t$ into a voltage signal (the error voltage signal $V_{error}$), the magnitude of a voltage signal for changing the weight of a synapse (the weight change pulse voltage signal $V_{POST1}$) can reflect the magnitude of an error between the output signal $V_{out}$ and the teaching signal $V_t$. Accordingly, the weight can be changed so that an error between the output signal $V_{out}$ and the teaching signal $V_t$ decreases. In this manner, the error back-propagation learning can be appropriately conducted.

Error Calculating Circuit

The error calculating circuit 5 according to the present exemplary embodiment is described below. The error calculating circuit 5 receives at least one output signal $V_{out}$ and at least one teaching signal $V_t$. The error calculating circuit 5 includes at least one output signal terminal 8. The number of the at least one output signal terminal 8 is the same as the number of the at least one teaching signal $V_t$ input to the error calculating circuit 5. The error calculating circuit 5 generates a voltage signal having a magnitude in accordance with a time difference between the output signal $V_{out}$ and the teaching signal $V_t$ corresponding to the output signal $V_{out}$ as the error voltage signal $V_{error}$. More specifically, the error calculating circuit 5 includes time difference calculating circuits 90 equal in number to the number of the output signal terminals 8 and a summing circuit 80. In FIG. 2A, the at least one output signal terminal 8 includes a plurality of output signal terminals 8a, 8b, . . . . In addition, in FIG. 2A, time difference calculating circuits 90a, 90b, . . . correspond to the output signal terminals 8a, 8b, . . . , respectively. That is, the error calculating circuit 5 includes at least one time difference calculating circuit 90, and the at least one time difference calculating circuit 90 in FIG. 2A includes the time difference calculating circuits 90a, 90b, . . . .

The time difference calculating circuit 90 generates the output signal $V_{out}$ to be output from the output signal terminal corresponding to one of the output signal terminals 8a, 8b, . . . . In addition, the time difference calculating circuit 90 generates the error voltage signal $V_{error}$ in accordance with the time difference between the output signal $V_{out}$ and the teaching signal $V_t$ corresponding to the output signal $V_{out}$. Thereafter, the time difference calculating circuit 90 outputs the error voltage signal $V_{error}$ to the neuron circuit 30 included in the neural network circuit element 40 in the output layer 4. More specifically, the time difference calculating circuit 90 includes a first input terminal 93 connected to the corresponding output signal terminal of the neural network circuit 1, a second input terminal 94 connected to a corresponding one of the teaching signal terminals 7a, 7b, . . . , and an output terminal 95 that outputs the error voltage signal $V_{error}$. The output terminal 95 is connected to the error input terminal 52 of the neural network circuit element 40 in the output layer 4.

The summing circuit 80 generates a sum voltage signal $V_{sam}$ obtained by summing the error voltage signals $V_{error}$ generated by the time difference calculating circuits 90 and inputs the sum voltage signal $V_{sam}$ to the neuron circuit 30 of the neural network circuit element 40 included in the intermediate layer 3. More specifically, the summing circuit 80 includes input terminals 84 equal in number to the number of the time difference calculating circuits 90 (each of the input terminals 84 is connected to the output terminal 95 of one of the time difference calculating circuits 90) and a output terminal 85 that outputs the sum voltage signal $V_{sam}$. The sum voltage signal $V_{sam}$ output from the output terminal 85 of the summing circuit 80 is fed back to the error input terminals 52 of all the neural network circuit elements 40 included in the intermediate layer 3.

Figure 10A:
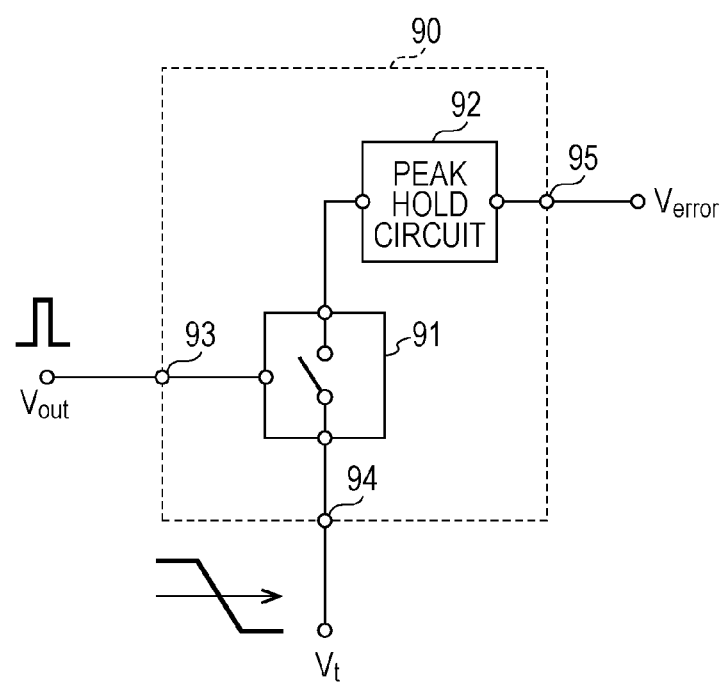
FIG. 10A is a block diagram illustrating an example of a schematic configuration of a time difference calculating circuit in an error calculating circuit of the neural network circuit element illustrated in FIG. 1.

FIG. 10A is a block diagram illustrating an example of a schematic configuration of the time difference calculating circuit in the error calculating circuit of the neural network circuit element illustrated in FIG. 1. As illustrated in FIG. 10A, the time difference calculating circuit 90 includes a switch 91 and a peak hold circuit 92. The switch 91 includes a pair of main terminals and a control terminal. One of the two main terminals is connected to the second input terminal 94 of the time difference calculating circuit 90, and the other main terminal is connected to an input terminal of the peak hold circuit 92 of the time difference calculating circuit 90. The control terminal is connected to the first input terminal 93. An output terminal of the peak hold circuit 92 is connected to the output terminal 95 of the time difference calculating circuit 90.

Figure 10B:
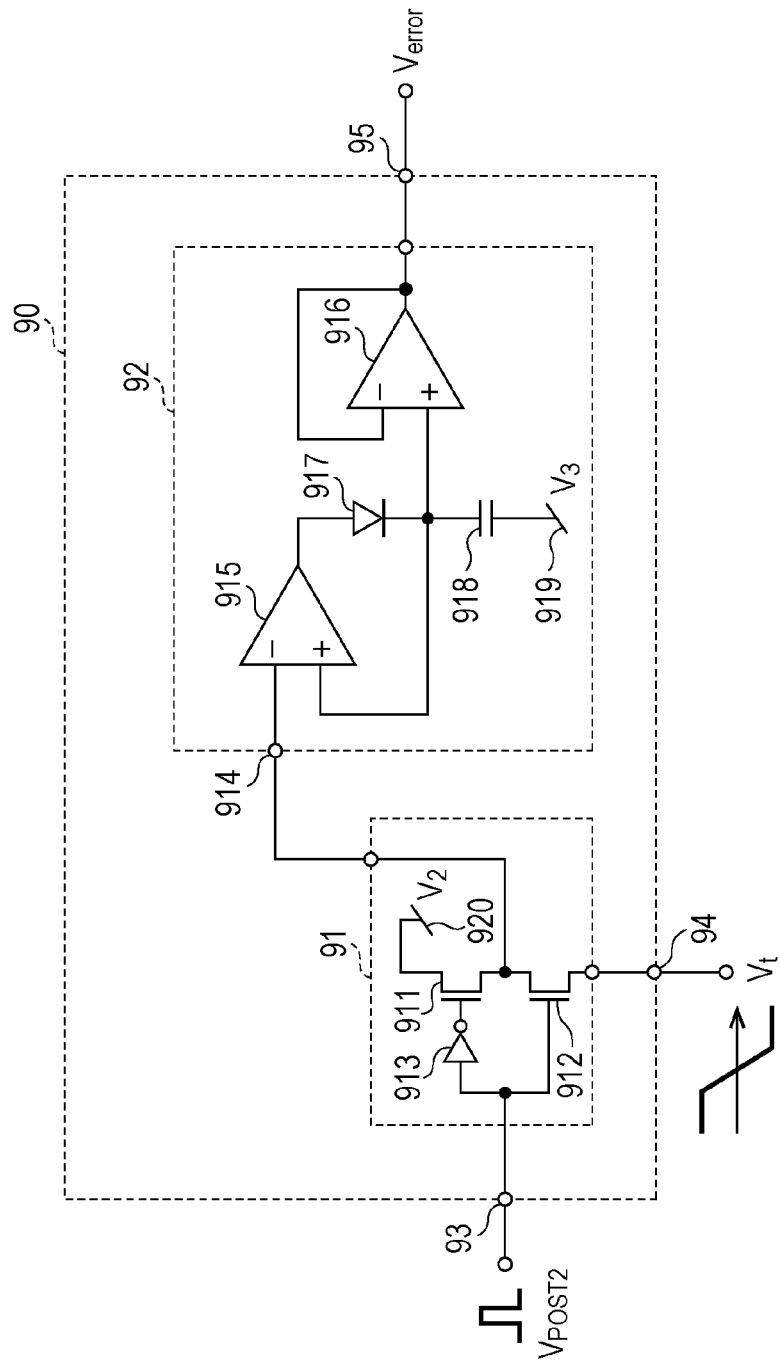
FIG. 10B is a circuit diagram illustrating a particular example of a switch and a peak hold circuit of the time difference calculating circuit illustrated in FIG. 10A.

FIG. 10B is a circuit diagram illustrating a particular example of the switch and the peak hold circuit of the time difference calculating circuit illustrated in FIG. 10A. In the particular example of FIG. 10B, the switch 91 is formed from at least two transistors that operate in complementary mode. In the example of FIG. 10B, the switch 91 includes two n-type MOSFETs 911 and 912 and an inverter 913. A second reference voltage source 920 is connected to a source terminal of the n-type MOSFET 911, which is one of the two n-type MOSFETs, and a second reference voltage $V_2$ is applied to the source terminal. A source terminal of the n-type MOSFET 912, which is the other n-type MOSFET, is connected to a drain terminal of the n-type MOSFET 911. A gate terminal of the n-type MOSFET 911 is connected to an output terminal of the inverter 913.

A drain terminal of the other n-type MOSFET is connected to the second input terminal 94 and receives the teaching signal $V_t$ input to the teaching signal terminal 7 of the input layer 2. The gate terminal of the n-type MOSFET 912 and the input terminal of the inverter 913 are connected to the first input terminal 93 and receive the switching pulse voltage signal $V_{POST2}$ output from the neural network circuit element 40 in the output layer 4. A common terminal disposed between the n-type MOSFETs 911 and 912 is connected to an input terminal 914 of the peak hold circuit 92. Note that instead of using the inverter 913, one of the n-type MOSFETs 911 and 912 (e.g., the n-type MOSFET 911) may be changed to a p-type MOSFET.

In such a configuration of the switch 91, during a period of time during which the switching pulse voltage signal $V_{POST2}$ applied to the first input terminal 93 is in a HI state, the n-type MOSFET 911 enters an open state (a disconnected state) and the n-type MOSFET 912 enters a closed state (a connected state). Accordingly, a voltage value corresponding to the teaching signal $V_t$ serves as the output voltage of the switch 91. During a period of time during which the switching pulse voltage signal $V_{POST2}$ is in a LO state, the n-type MOSFET 911 enters a closed state (a connected state) and the n-type MOSFET 912 enters an open state (a disconnected state). Accordingly, the output voltage is the same as the second reference voltage $V_2$. The second reference voltage $V_2$ is set so as to be lower than or equal to, for example, the minimum potential of the teaching signal $V_t$ (negative potential that maximizes the potential difference from the reference potential).

In the example illustrated in FIG. 10B, the peak hold circuit 92 includes a first operational amplifier 915, a second operational amplifier 916, a diode 917, a capacitor 918, and a third reference voltage source 919. The capacitance value of the capacitor 918 is, for example, 100 pF. The input terminal 914 of the peak hold circuit 92 is connected to a negative input terminal (−) of the first operational amplifier 915. A positive input terminal (+) of the first operational amplifier 915 is connected to a positive input terminal (+) of the second operational amplifier 916. An anode of the diode 917 is connected to an output terminal of the first operational amplifier 915. A cathode of the diode 917 is connected to the positive input terminal (+) of the first operational amplifier 915 and the positive input terminal (+) of the second operational amplifier 916.

In addition, the cathode of the diode 917, the positive input terminals (+) of the first operational amplifier 915 and the second operational amplifier 916 are connected to one end of the capacitor 918. The third reference voltage source 919 is connected to the other end of the capacitor 918. The negative input terminal (−) of the second operational amplifier 916 is connected to an output terminal of the second operational amplifier 916. The output terminal of the second operational amplifier 916 is connected to the output terminal 95 of the time difference calculating circuit 90. A third reference voltage $V_3$ of the third reference voltage source 919 is set to a potential that is lower than the reference potential of the teaching signal $V_t$ (e.g., zero potential), for example, a potential that is lower than or equal to a minimum potential of the teaching signal $V_t$. The second reference voltage $V_2$ is set to a potential that is lower than or equal to the third reference voltage $V_3$.

According to such a configuration, the time difference calculating circuit 90 outputs a DC voltage in accordance with a time difference between the switching pulse voltage signal $V_{POST2}$ and the teaching signal $V_t$ to the output terminal 95 of the error calculating circuit 5. In a state before the switching pulse voltage signal $V_{POST2}$ is input to the first input terminal 93 (a LO state), the capacitor 918 is charged so as to have a potential that is the same as the third reference voltage $V_3$ and, thus, the potential of the output terminal 95 is the same as the third reference voltage $V_3$. If the pulse waveform of the switching pulse voltage signal $V_{POST2}$ is input to the first input terminal 93, the switch 91 outputs the voltage of the teaching signal $V_t$ obtained when the switching pulse voltage signal $V_{POST2}$ is in the HI state. That is, when the time difference between the switching pulse voltage signal $V_{POST2}$ and the teaching signal $V_t$ is within a predetermined range and if the switching pulse voltage signal $V_{POST2}$ is input earlier than the teaching signal $V_t$ ($t_0-t_t>0$), the output voltage has a larger potential difference from the reference potential as the negative polarity and the time difference increase. In contrast, if the switching pulse voltage signal $V_{POST2}$ is input later than the teaching signal $V_t$ ($t_0-t_t<0$), the output voltage has a larger potential difference from the reference potential as the positive polarity and the time difference increase. If the time difference between the switching pulse voltage signal $V_{POST2}$ and the teaching signal $V_t$ is zero, the output voltage is substantially the same as the reference potential of the teaching signal $V_t$.

If the voltage output from the switch 91 is input to the input terminal 914 of the peak hold circuit 92, the capacitor 918 is charged by the output voltage. Accordingly, the potential of the output terminal 95 of the time difference calculating circuit 90 is the same as the potential of the input terminal 914. Even when the output of the switch 91 returns to the third reference voltage $V_3$, the capacitor 918 is in an open state since the diode 917 is reverse-biased. Thus, the capacitor 918 is neither charged nor discharged and, thus, the potential of the output terminal 95 is maintained at a maximum potential output from the switch 91. According to the configuration, the peak hold circuit 92 can output a DC voltage having a polarity and a magnitude that vary in accordance with the time difference between the switching pulse voltage signal $V_{POST2}$ and the teaching signal $V_t$ to the output terminal 95 as the error voltage signal $V_{error}$.

Note that the peak hold circuit 92 has a switch connected thereto (not illustrated). The switch determines whether the positive input terminal (+) of the second operational amplifier 916 is connected to the ground potential. If a pulse of the switching pulse voltage signal $V_{POST2}$ is input to the time difference calculating circuit 90 and the switch enters a closed state at a predetermined timing after the error voltage signal $V_{error}$ based on the pulse is output, the charge in the capacitor 918 is discharged, and the condition is reset to the original condition (a condition that causes the potential of the output terminal 95 to be the same as the third reference voltage $V_3$).

Figure 11:
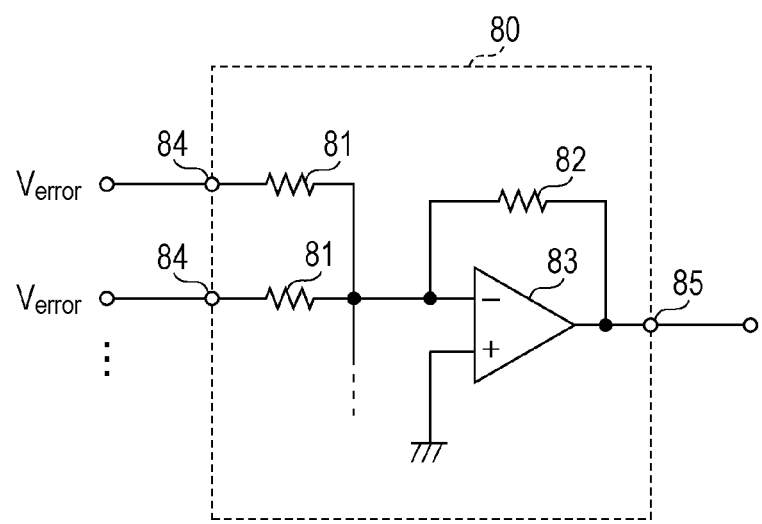
FIG. 11 is a circuit diagram illustrating an example of a summing circuit of the error calculating circuit of the neural network circuit element illustrated in FIG. 1.

FIG. 11 is a circuit diagram illustrating an example of the summing circuit of the error calculating circuit of the neural network circuit element illustrated in FIG. 1. As illustrated in FIG. 11, the summing circuit 80 is formed as an analog summing circuit including resistive elements 81 equal in number to the number of the time difference calculating circuits 90 (i.e., the number of the input error voltage signals $V_{error}$), an operational amplifier 83, and a feedback resistive element 82. The resistance value of each of the resistive elements 81 and the feedback resistive element 82 is, for example, 1 kΩ. The potential of the positive input terminal (+) of the operational amplifier 83 is set to the ground potential. The negative input terminal (−) of the operational amplifier 83 is connected to the input terminals 84 of the summing circuit 80 via the resistive elements 81. The output terminal of the operational amplifier 83 is connected to the output terminal 85 of the summing circuit 80.

By using the summing circuit 80 having such a configuration, the error voltage signals $V_{error}$ each determined in accordance with the time difference between the switching pulse voltage signal $V_{POST2}$ generated by one of the neural network circuit elements 40 included in the output layer 4 and the teaching signal $V_t$ are combined into one signal. The signal is output as the sum voltage signal $V_{sam}$.

In this manner, for the neural network circuit element 40 included in the output layer 4, the weight can be changed so as to decrease the error between the corresponding output signal $V_{out}$ and the teaching signal $V_t$ on the basis of the error. Furthermore, for the neural network circuit element 40 included in the intermediate layer 3, the weight can be changed on the basis of the sum voltage signal $V_{sam}$ obtained by summing the generated error voltage signals $V_{error}$. Thus, error back-propagation learning can be conducted for all the neural network circuit elements 40 including the neural network circuit elements 40 included in the output layer 4.

Back-Propagation Learning

The way to conduct back-propagation learning using the neural network circuit 1 is described in more detail below.

The case in which learning of one pattern is described first. To conduct the error back-propagation learning, a predetermined input signal $V_{in}$ illustrated in FIG. 3A is input to the input signal terminal 6. In addition, a teaching signal $V_t$ that corresponds to a desired output signal $V_{out}$ and that is illustrated in FIG. 3B is input to the teaching signal terminal 7. As described below, the input operation is performed twice for one pattern (hereinafter, the first input operation is called a "first step", and the second input operation is called a "second step").

At that time, the information regarding each of the signals is expressed using the input timing of a pulse. For example, if "0" is input, a pulse voltage is input at a time t=0 ms. If "1" is input, a pulse voltage is input at the time=1 ms. Note that an input timing is defined as a center point of the waveform of a pulse, such as the time $t_{in}$ illustrated in FIG. 3A or the time $t_t$ illustrated in FIG. 3B.

In addition, the switching pulse voltage signal $V_{POST2}$ output from the output terminal 53 of the neural network circuit element 40 included in the output layer 4 is output as the output signal $V_{out}$ of the neural network circuit 1. Like the input signal $V_{in}$, the output information regarding the output signal $V_{out}$ is expressed using the output timing. For example, if "0" is output, the switching pulse voltage signal $V_{POST2}$ is output at a time t=10 ms, and if "1" is output, the switching pulse voltage signal $V_{POST2}$ is output at a time t=11 ms.

In the learning method according to the present exemplary embodiment, in the first step, the amplitude of the weight change pulse voltage signal $V_{POST1}$ output from the neuron circuit 30 of the neural network circuit element 40 included in the output layer 4 is changed on the basis of the error voltage signal $V_{error}$. Thereafter, in the second step, the amplitude of the weight change pulse voltage signal $V_{POST1}$ output from the neuron circuit 30 of the neural network circuit element 40 included in the intermediate layer 3 is changed on the basis of the error voltage signal $V_{error}$.

More specifically, in the first step, by, instead of inputting the weight change pulse voltage signal, inputting a signal having potential that is the same as the reference potential (e.g., the ground voltage) to the synapse circuit 20 of the neural network circuit element 40 included in the intermediate layer 3, the resistance value of the variable resistive element 10 of the neural network circuit element 40 included in the output layer 4 is changed with the resistance value of the variable resistive element 10 of the neural network circuit element 40 included in the intermediate layer 3 remaining unchanged. In the second step, by inputting, to the synapse circuit 20 of the neural network circuit element 40 included in the intermediate layer 3, the weight change pulse voltage signal $V_{POST1}$ having the first waveform generated by the neuron circuit 30 of the neural network circuit element 40 including the synapse circuit 20, the resistance value of the variable resistive element 10 of the neural network circuit element 40 included in the intermediate layer 3 is changed. The learning operation including the first step and the second step is repeated until the time difference between the teaching signal $V_t$ and a corresponding output signal $V_{out}$ is less than or equal to a predetermined value.

According to the above-described method, the weight is changed on the basis of the error back-propagation learning for the neural network circuit element 40 included in the output layer 4 first. Subsequently, for the neural network circuit element 40 included in the intermediate layer 3, the weight is changed on the basis of the error back-propagation learning. Thus, the weight can be efficiently changed for the synapse circuit 20 of each of the neural network circuit elements 40. As a result, the error back-propagation learning can be appropriately conducted.

The steps are described in more detail below.

First Step

As described above, the switching pulse voltage signal $V_{PRE}$ is input from the input signal terminal 6 to the first input terminal 51 of the neural network circuit element 40 included in the intermediate layer 3 as the input signal $V_{in}$. Accordingly, for the predetermined duration during which the input signal $V_{in}$ is in the HI state, the first switch 21 and the second switch 22 enter the closed state. If the second switch 22 enters the closed state, the first reference voltage source 23 is connected to the first terminal 13 of the variable resistive element 10 and, thus, the first reference voltage $V_1$ is applied between the first terminal 13 and the second terminal 14 of the variable resistive element 10.

In the first step, instead of the weight change pulse voltage signal $V_{POST1}$ having the first waveform illustrated in FIG. 5A, a signal having a potential that is the same as the reference potential (e.g., the ground voltage) is input to the synapse circuit 20 of the neural network circuit element 40 included in the intermediate layer 3. More specifically, for example, the neuron circuit 30 of the neural network circuit element 40 included in the intermediate layer 3 is configured so as to output the reference potential from the first output terminal 47 at all times in the first step. To achieve such a configuration, for example, the digital memory 331 of the waveform generating circuit 33 outputs the reference potential in the first step and outputs the first waveform in the second step. To determine whether the first step or the second step occurs, the waveform generating circuit 33 may receive a signal indicating the first step or the second step. For example, the input layer 2 may include an identification signal input terminal connected to the waveform generating circuit 33, and a user of the neural network circuit may input an identification signal indicating the first step or the second step to the identification signal input terminal). Alternatively, the waveform generating circuit 33 may include a memory that can store the number of times at which the switching pulse voltage signal $V_{PRE}$ is input to the synapse circuit 20 and may determine which one of the first step and the second step occurs on the basis of the number of times.

As described above, even when the first switch 21 and the second switch 22 enter a closed mode, a voltage that causes a variation of the resistance value of the variable resistive element 10 is not applied to the third terminal 15 of the variable resistive element 10 (the variable resistive element 10 is not in the HI state). Accordingly, the resistance value of the variable resistive element 10 of the neural network circuit element 40 included in the intermediate layer 3 does not vary. That is, in the first step, a learning operation is not performed by the neuron circuit 30 of the neural network circuit element 40 included in the intermediate layer 3. Accordingly, the switching pulse voltage signal $V_{POST2}$ is generated at a timing in accordance with the present resistance value of the variable resistive element 10 and is sent to the neural network circuit element 40 included in the output layer 4.

The switching pulse voltage signal $V_{POST2}$ output from the neural network circuit element 40 included in the intermediate layer 3 is input to the first input terminal 51 of the neural network circuit element 40 included in the output layer 4. In addition, in the first step, the weight change pulse voltage signal $V_{POST1}$ having the first waveform illustrated in FIG. 5A is fed back to the synapse circuit 20 of the neural network circuit element 40 included in the output layer 4. Accordingly, in the first step, the resistance value of the variable resistive element 10 varies on the basis of the weight change pulse voltage signal $V_{POST1}$ in the neural network circuit element 40 included in the output layer 4.

Furthermore, the switching pulse voltage signal $V_{POST2}$ output from the neural network circuit element 40 included in the output layer 4 (the output signal $V_{out}$) is also input to the first input terminal 93 of the time difference calculating circuit 90 of the error calculating circuit 5. The time difference calculating circuit 90 outputs the error voltage signal $V_{error}$ having an amplitude (and the polarity) in accordance with the time difference between the output signal $V_{out}$ and the teaching signal $V_t$.

The error voltage signal $V_{error}$ is fed back to the error input terminal 52 of the neural network circuit element 40 included in the output layer 4. The error voltage signal $V_{error}$ input to the error input terminal 52 serves as a multiplier coefficient of the analog multiplier circuit 333 of the neuron circuit 30 and is multiplied by the second waveform. As a result, the weight change pulse voltage signal $V_{POST1}$ generated by the neuron circuit 30 of the neural network circuit element 40 included in the output layer 4 becomes a signal having an amplitude that is proportional to the amplitude of the error voltage signal $V_{error}$.

As described above, the waveform generating circuit 33 of the neuron circuit 30 generates the weight change pulse voltage signal $V_{POST1}$ at the same timing as the switching pulse voltage signal $V_{POST2}$. The input duration of the error voltage signal $V_{error}$ is sufficiently shorter than the pulse width of the switching pulse voltage signal $V_{PRE}$. Accordingly, it can be considered that the weight change pulse voltage signal $V_{POST1}$ that reflects the feedback input of the error voltage signal $V_{error}$ is output at the same time as the switching pulse voltage signal $V_{POST2}$.

As described above, in the neural network circuit element 40 included in the output layer 4, the resistance value of the variable resistive element 10 varies on the basis of a time difference between the weight change pulse voltage signal $V_{POST1}$ having an amplitude in accordance with the time difference between the output signal $V_{out}$ and the teaching signal $V_t$ and the switching pulse voltage signal $V_{PRE}$. In this manner, a learning operation is performed. That is, in the learning operation performed by the neural network circuit element 40 included in the output layer 4, an error between the output signal $V_{out}$ and the teaching signal $V_t$ is taken into account.

Note that in the first step, the error voltage signal $V_{error}$ generated by the time difference calculating circuit 90 on the basis of the switching pulse voltage signal $V_{POST2}$ (the output signal $V_{out}$) output from the neural network circuit element 40 included in the output layer 4 is also input to the summing circuit 80. The summing circuit 80 sums all the input error voltage signals $V_{error}$ and generates the sum voltage signal $V_{sam}$. The sum voltage signal $V_{sam}$ is used in the second step.

Second Step

Subsequently, in the second step, the input signals $V_{in}$ having the same pattern are input to the input signal terminals 6 again, and the teaching signals $V_t$ each corresponding to one of the input signals $V_{in}$ are input to the teaching signal terminals 7.

At that time, in the second step, the synapse circuit 20 of the neural network circuit element 40 included in the intermediate layer 3 receives the weight change pulse voltage signal $V_{POST1}$ having the first waveform illustrated in FIG. 5A and generated by the neuron circuit 30 of the neural network circuit element 40 including the synapse circuit 20. Accordingly, in the second step, the resistance value of the variable resistive element 10 in the neural network circuit element 40 included in the intermediate layer 3 varies on the basis of the weight change pulse voltage signal $V_{POST1}$.

As described above, in the first step, the summing circuit 80 generates the sum voltage signal $V_{sam}$ by summing all the error voltage signals $V_{error}$ generated by the time difference calculating circuits 90 on the basis of the switching pulse voltage signal $V_{POST2}$ (the output signal $V_{out}$) output from the neural network circuit element 40 included in the output layer 4. Thereafter, the sum voltage signal $V_{sam}$ is fed back to the error input terminal 52 of the neural network circuit element 40 included in the intermediate layer 3. The error voltage signal $V_{error}$ input to the error input terminal 52 serves as the multiplier coefficient of the analog multiplier circuit 333 of the neuron circuit 30 and is multiplied by the second waveform. As a result, the weight change pulse voltage signal $V_{POST1}$ generated by the neuron circuit 30 of the neural network circuit element 40 included in the intermediate layer 3 becomes a signal having an amplitude that is proportional to the amplitude of the sum voltage signal $V_{sam}$.

Accordingly, in the second step, the resistance value of the variable resistive element 10 in the neural network circuit element 40 included in the intermediate layer 3 varies on the basis of the weight change pulse voltage signal $V_{POST1}$ having an amplitude in accordance with the time difference between the weight change pulse voltage signal $V_{POST1}$ having an amplitude in accordance with the total sum of the time differences between the output signal $V_{out}$ and the teaching signal $V_t$ generated in the first step and the switching pulse voltage signal $V_{PRE}$. In this manner, a learning operation is performed. That is, like the learning operation performed by the neural network circuit element 40 included in the output layer 4, in the learning operation performed by the neural network circuit element 40 included in the intermediate layer 3, an error between the output signal $V_{out}$ and the teaching signal $V_t$ is taken into account. Thus, in the synapse circuits 20 of all the neural network circuit elements 40 that constitute the neural network circuit 1, the weights can be appropriately changed in accordance with the contribution ratio of the synapse circuit 20 to the output signal $V_{out}$ so that the error between the output signal $V_{out}$ and the teaching signal $V_t$ decreases.

Note that in the second step, the need for the learning operation performed by the neural network circuit element 40 included in the output layer 4 may be eliminated. In such a case, in the second step, a signal having a potential that is the same as the reference potential (e.g., the ground voltage) is input to the synapse circuit 20 of the neural network circuit element 40 included in the output layer 4 instead of the weight change pulse voltage signal $V_{POST1}$ having the first waveform illustrated in FIG. 5A. Alternatively, the neural network circuit element 40 included in the output layer 4 may perform the learning operation in both the first and second steps.

As described above, in the first step in which a first input of the input signal $V_{in}$ and the teaching signal $V_t$ is performed, the learning operation is performed in the output layer 4. In the second step in which a second input is performed, the learning operation is performed in the intermediate layer 3. In this manner, the error back-propagation learning in which the learning operation is performed in a layer the closest to the output signal terminal 8 first, then in the next layer and then the next can be conducted.

To perform the learning operation for one pattern, one learning trial including the first step and the second step is repeatedly performed until the time difference between the teaching signal $V_t$ and the output signal $V_{out}$ corresponding to the teaching signal $V_t$ is less than or equal to a predetermined value. To perform the learning operation for a plurality of different patterns, a learning trial including the first step and the second step is performed for a first pattern. Subsequently, the learning trial including the first step and the second step is performed for a second pattern. In this manner, by changing the pattern to the next pattern, the learning trial including the first step and the second step is performed. A single learning operation is defined as the learning trials each including the first step and the second step and performed the number of times equal to the number of patterns. The single learning operation is repeatedly performed until the time difference between the teaching signal $V_t$ and the output signal $V_{out}$ corresponding to the teaching signal $V_t$ is less than or equal to a predetermined value for all the patterns.

Examples

Examples are described below.
Evaluation of Synapse Circuit

As a first example, a test synapse circuit 20A using a ferroelectric memristor illustrated in FIG. 7A as the variable resistive element 10 was configured for evaluation. It was examined whether the switching operation illustrated in FIG. 9 was available by using the test synapse circuit 20A.

Figure 12:
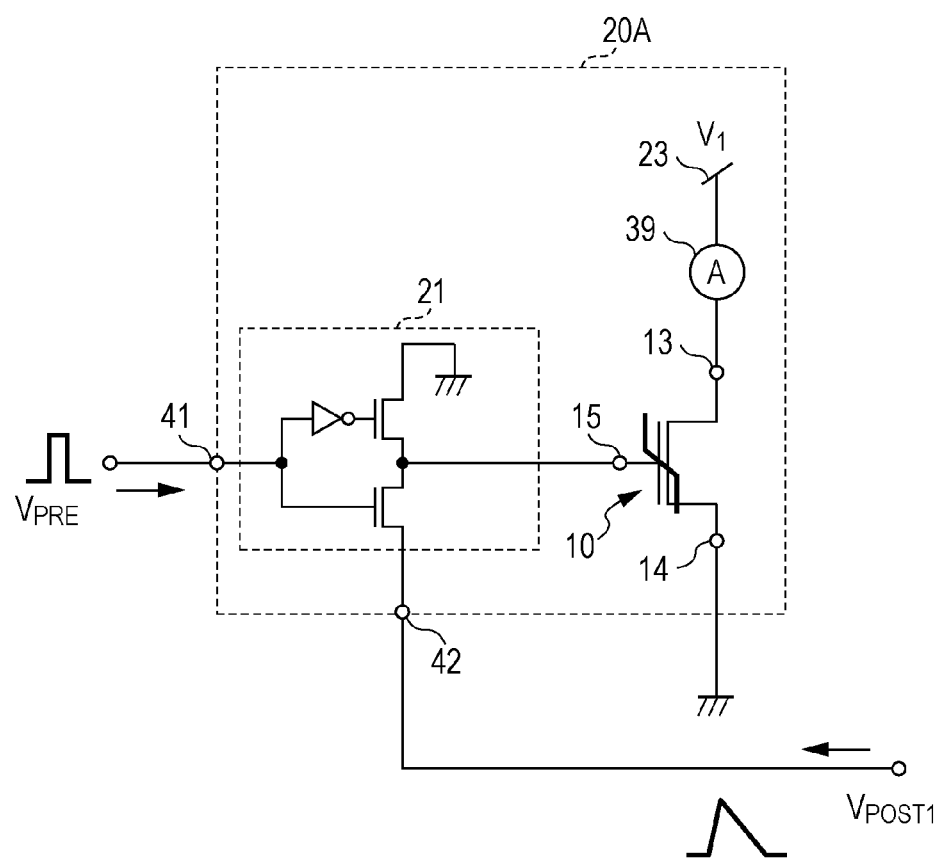
FIG. 12 is a block diagram illustrating an example of the configuration of a test synapse circuit according to a first example of the present disclosure.

FIG. 12 is a block diagram illustrating an example of the configuration of a test synapse circuit according to the first example of the present disclosure. The test synapse circuit 20A illustrated in FIG. 12 employs the ferroelectric memristor illustrated in FIG. 7A as the variable resistive element 10 (in FIG. 12, the variable resistive element 10 is indicated by the circuit symbol used in FIG. 7B). In addition, among the configurations of the test synapse circuit 20A, the configurations for examining the switching operation are removed from the synapse circuit 20 illustrated in FIG. 1. More specifically, the test synapse circuit 20A does not include the second switch 22 illustrated in FIG. 1. Accordingly, the first reference voltage source 23 is connected to the first terminal 13 of the variable resistive element 10 via the ammeter 39. In addition, the output terminal 43 of the test synapse circuit 20A is grounded. Furthermore, the first switch 21 has a configuration that is the same as that of FIG. 8. The first reference voltage $V_1$ of the first reference voltage source 23 is, for example, 0.1 V.

As described above, the first switch 21 operates so that during a period of the switching pulse voltage signal $V_{PRE}$ being in the HI state (the input allowed interval), the weight change pulse voltage signal $V_{POST1}$ is applied to the control electrode 73 of the variable resistive element 10 and, during the other period, the control electrode 73 of the variable resistive element 10 is grounded.

In this examination, the weight change pulse voltage signal $V_{POST1}$ illustrated in FIG. 5A and the switching pulse voltage signal $V_{PRE}$ illustrated in FIG. 5B were input. Note that in the examination, the cycle of the weight change pulse voltage signal $V_{POST1}$ was 32 ms (a period from the time the voltage is zero to the time the voltage is maximized was 7 ms, and a period from the time the voltage is maximized to the time the voltage is back to zero was 25 ms). In this examination, the operation performed by the test synapse circuit was examined when the amplitude of the weight change pulse voltage signal $V_{POST1}$ is changed in accordance with the error voltage signal $V_{error}$ by using two weight change pulse voltage signals $V_{POST1}$ having maximum voltage values $V_{MAX}$ of 1.0 V and 0.5 V. Note that the pulse width of the switching pulse voltage signal $V_{PRE}$ used in the examination was 1 ms, and each of the maximum values of the positive voltage and the negative voltage was 5 V. By using such a waveform and changing the application timings of the weight change pulse voltage signal $V_{POST1}$ and the switching pulse voltage signal $V_{PRE}$, the electrical conductance values (the electric current values obtained by an ammeter 39) before and after the weight change pulse voltage signal $V_{POST1}$ and the switching pulse voltage signal $V_{PRE}$ were applied were measured.

Figure 13:
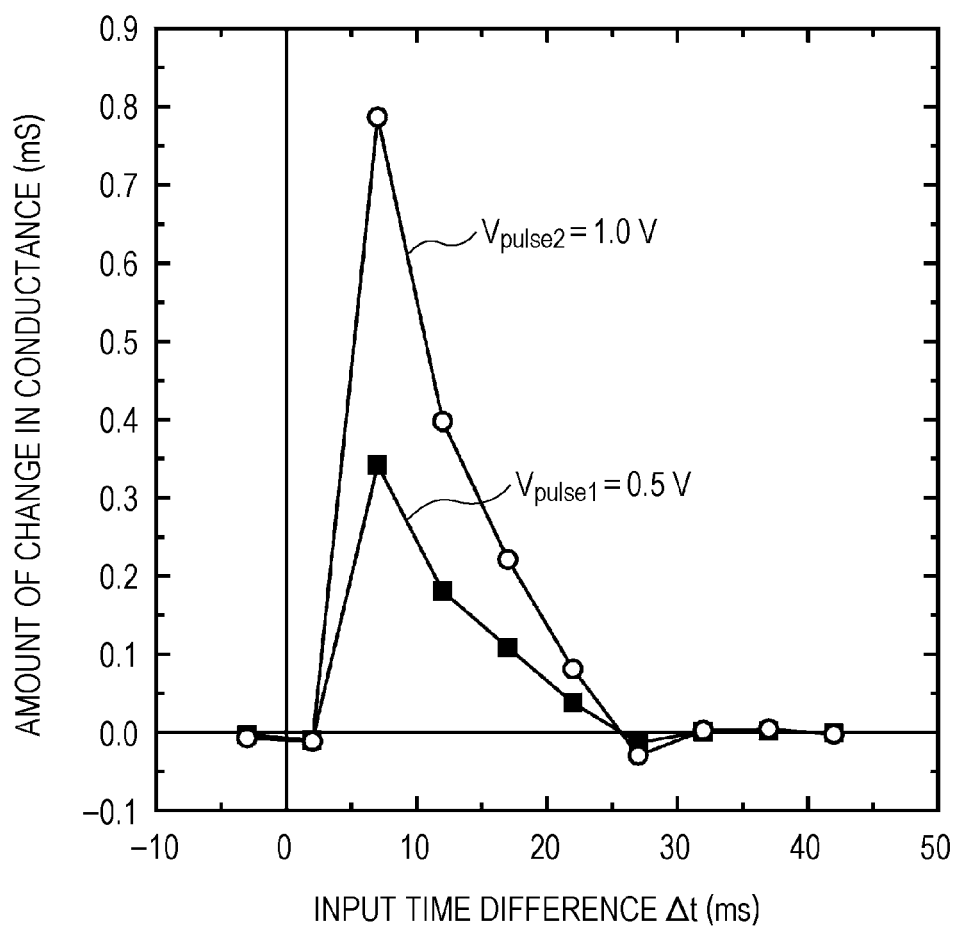
FIG. 13 is a graph illustrating the result of examination using the test synapse circuit illustrated in FIG. 12.

FIG. 13 is a graph illustrating the result of examination using the test synapse circuit illustrated in FIG. 12. FIG. 13 illustrates an amount of change in the electrical conductance of the variable resistive element 10 against a time difference between the weight change pulse voltage signal $V_{POST1}$ and the switching pulse voltage signal $V_{PRE}$ obtained from the test synapse circuit 20A illustrated in FIG. 12. In FIG. 13, $V_{pulse1}$ represents a pulse voltage in accordance with the time difference between the weight change pulse voltage signal $V_{POST1}$ having a maximum value $V_{MAX}$ of the voltage of 0.5 V and the switching pulse voltage signal $V_{PRE}$, and $V_{pulse2}$ represents a pulse voltage in accordance with the time difference between the weight change pulse voltage signal $V_{POST1}$ having a maximum voltage value $V_{MAX}$ of 1.0 V and the switching pulse voltage signal $V_{PRE}$.

As illustrated in FIG. 13, by using a ferroelectric memristor as the variable resistive element 10, the pulse voltages $V_{pulse1}$ and $V_{pulse2}$ that change the conductance of the variable resistive element 10 in accordance with the input timing difference between the weight change pulse voltage signal $V_{POST1}$ and the switching pulse voltage signal $V_{PRE}$ can be obtained. In addition, the pulse voltages $V_{pulse1}$ and $V_{pulse2}$ that change the conductance to different values by changing the amplitude of the weight change pulse voltage signal $V_{POST1}$ even when the time differences are the same can be obtained. That is, the above-described measurement results indicate that the learning operation can be appropriately performed in accordance with the input timing difference between the weight change pulse voltage signal $V_{POST1}$ and the switching pulse voltage signal $V_{PRE}$ and the amplitude of the weight change pulse voltage signal $V_{POST1}$ that varies with the error voltage signal $V_{error}$ that is fed back from the error calculating circuit 5.

Evaluation of Error Back-Propagation Learning

Subsequently, as a second example, it was examined whether an error back-propagation learning operation was available in a neural network circuit having a plurality of test synapse circuits 29B each using the ferroelectric memristor serving as the variable resistive element 10 and illustrated in FIG. 7A.

Figure 14A:
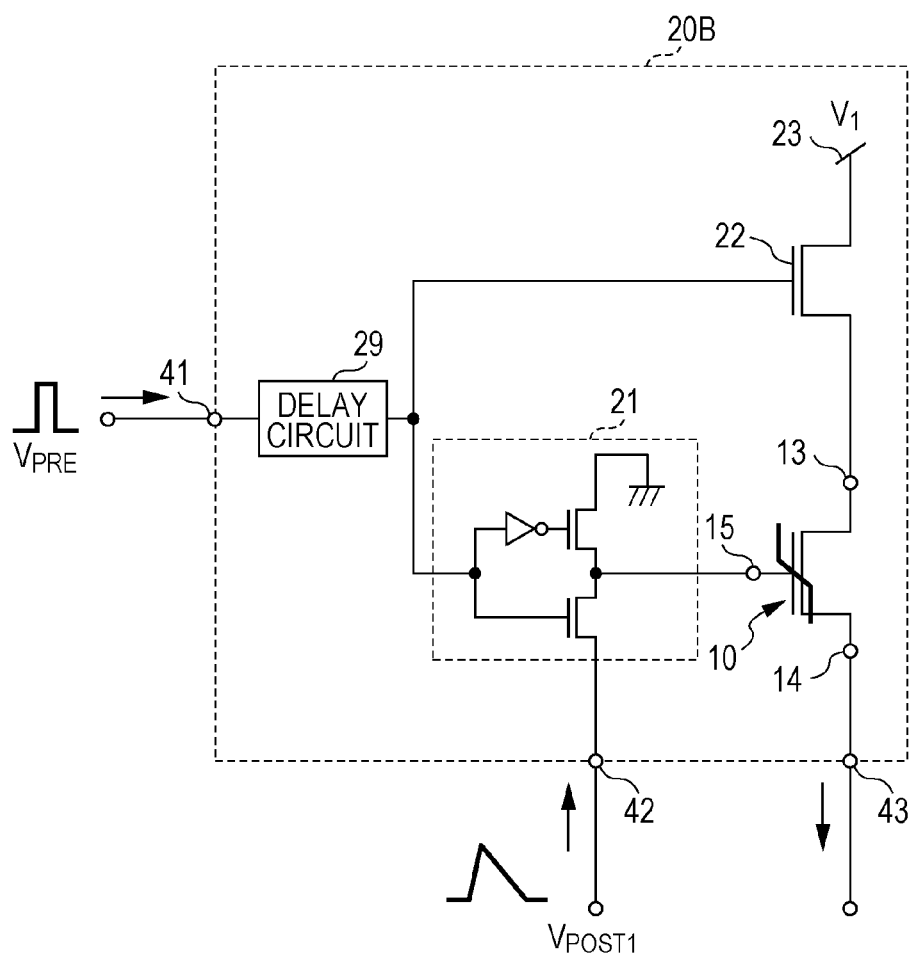
FIG. 14A is a block diagram illustrating an example of the configuration of a test synapse circuit according to a second example of the present disclosure.
Figure 14B:
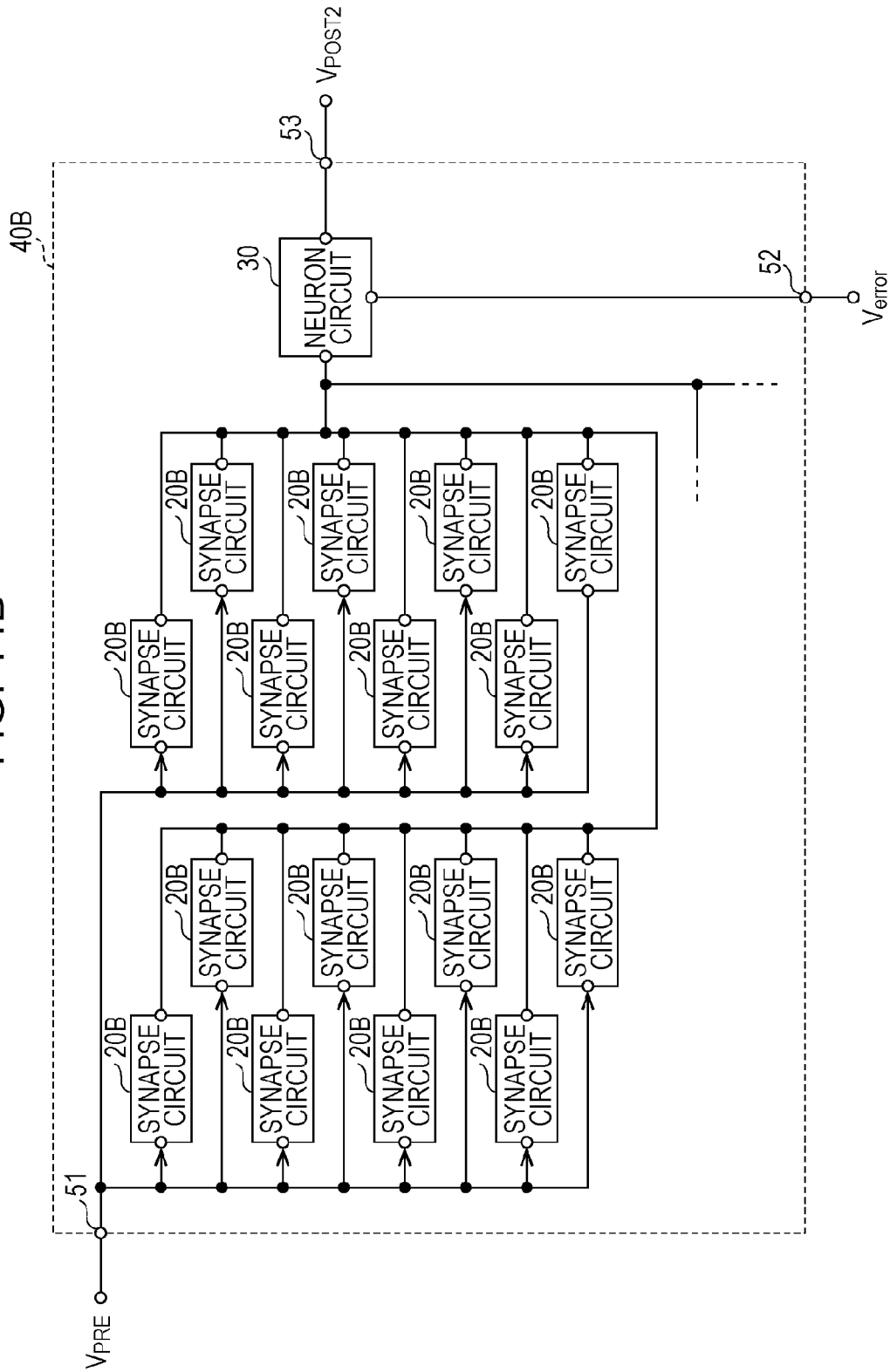
FIG. 14B is a block diagram illustrating an example of the configuration of a test neural network circuit element using the test synapse circuit illustrated in FIG. 14A.
Figure 14C:
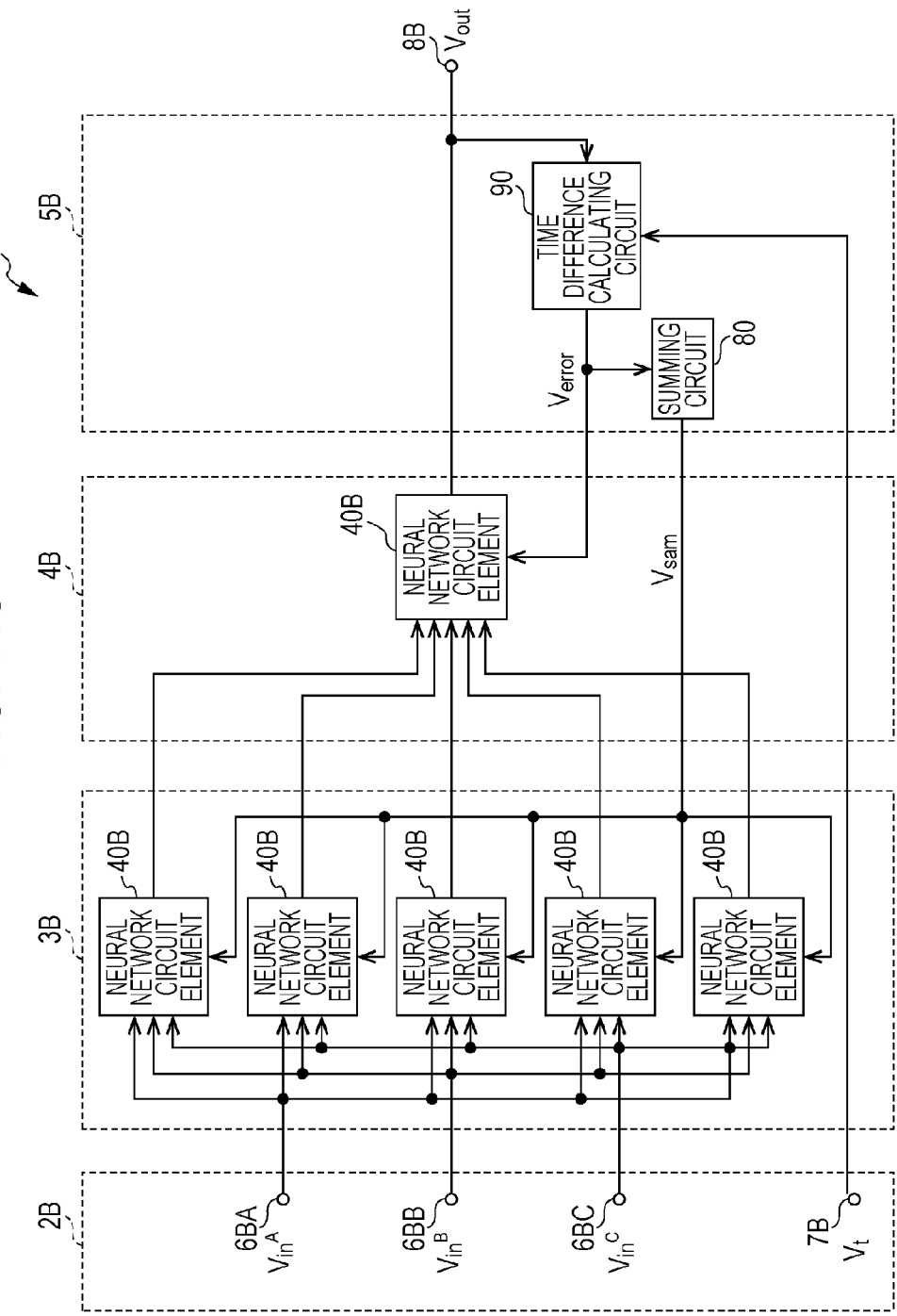
FIG. 14C is a block diagram illustrating an example of the configuration of a test neural network circuit using the test neural network circuit element illustrated in FIG. 14B.

FIG. 14A is a block diagram illustrating an example of the configuration of a test synapse circuit according to the second example of the present disclosure. FIG. 14B is a block diagram illustrating an example of the configuration of a test neural network circuit element using the test synapse circuit illustrated in FIG. 14A. FIG. 14C is a block diagram illustrating an example of the configuration of a test neural network circuit using the test neural network circuit element illustrated in FIG. 14B.

For simplicity, in FIG. 14B, only one switching pulse voltage signal $V_{PRE}$ is input to only one neural network circuit element 40B. However, in reality, as illustrated in FIG. 14C, a plurality of switching pulse voltage signals $V_{PRE}$ can be input to each of the neural network circuit elements 40B.

In the second example, the neural network circuit element 40B includes 16 synapse circuits 20B each including a delay circuit 29 having a delay time that differs from a delay time of another delay circuit 29. The delay times of the delay circuits 29 of the 16 synapse circuits 20B were 1, 2, 3, . . . , and 16 ms. In FIG. 14B, for simplicity, a wire line for the weight change pulse voltage signal $V_{POST1}$ that is fed back from the neuron circuit 30 to the synapse circuit 20B is not illustrated. The circuit illustrated in FIG. 4 is used as an integration circuit 31 of the neuron circuit 30. The resistance value of a resistive element 37 was 500 kΩ, and the capacitance value of a capacitor 36 was 1 nF. A threshold value $V_{TH}$ of the comparator circuit 32 was 5.0 V.

An input layer 2B of a neural network circuit 1B includes three input signal terminals 6BA, 6BB, and 6BC and a teaching signal terminal 7B. Input signals $V_{in}^A$, $V_{in}^B$, and $V_{in}^C$ are input to the input signal terminals 6BA, 6BB, and 6BC, respectively. A teaching signal $V_t$ is input to the teaching signal terminal 7B. An intermediate layer 3B includes five neural network circuit elements 40B, and an output layer 4B includes one neural network circuit element 40B.

The input signal terminals 6BA, 6BB, and 6BC of the input layer 2B are connected to the first input terminal 51 of each of all the neural network circuit elements 40B included in the intermediate layer 3B. The output terminal 53 of the neural network circuit element 40B included in the intermediate layer 3B is connected to the first input terminal 51 of the neural network circuit element 40B included in the output layer 4B. The output terminal 53 of the neural network circuit element 40B included in the output layer 4B is connected to an output signal terminal 8B of the neural network circuit 1B.

According to the present example, to evaluate the back-propagation learning, learning of exclusive OR (XOR) was conducted. The learning of exclusive OR is a widely used learning pattern for evaluating the learning performance of error back-propagation learning. Four combinations of two inputs and one output of exclusive OR are illustrated in TABLE 1.

TABLE 1

| Input 1 | Input 2 | Output |
|---------|---------|--------|
| 0 | 0 | 0 |
| 0 | 1 | 1 |
| 1 | 0 | 1 |
| 1 | 1 | 0 |

As described above, in spiking neuron models, information is expressed using pulse timings. Thus, according to the present example, "0" and "1" which represent the input and output are expressed by an input time and an output time of pulses illustrated in TABLE 2. Note that $t_{in}$ represents the input time of the input signal $V_{in}$, and $t_t$ represents the input time of the teaching signal $V_t$.

TABLE 2

| $t_{in}^A$ | $t_{in}^B$ | $t_{in}^C$ | $t_t$ |
|------------|------------|------------|-------|
| 6 ms | 6 ms | 0 ms | 16 ms |
| 6 ms | 0 ms | 0 ms | 10 ms |

TABLE 2-continued

| $t_{in}^A$ | $t_{in}^B$ | $t_{in}^C$ | $t_t$ |
|------------|------------|------------|-------|
| 0 ms | 6 ms | 0 ms | 10 ms |
| 0 ms | 0 ms | 0 ms | 16 ms |

As described above, $V_{in}^A$ represents the input signal corresponding to the input 1, and $V_{in}^B$ represents the input signal corresponding to the input 2. A signal indicating "1" was input as the input signal $V_{in}^C$ at all times.

A rectangular pulse having a pulse width of 7 ms was used as the input signal $V_{in}$. The maximum value of the rectangular pulse was set to +5 V, and the minimum value of the rectangular pulse was set to −5 V. The first waveform having a triangular pulse shape illustrated in FIG. 5B was used as the weight change pulse voltage signal $V_{POST1}$ output from the neuron circuit 30. The cycle of the weight change pulse voltage signal $V_{POST1}$ was set to 32 ms (a period from the time the voltage is zero to the time the voltage is maximized is 7 ms, and a period from the time the voltage is maximized to the time the voltage is back to zero is 25 ms). Like the above-described examination, in this examination, two weight change pulse voltage signals $V_{POST1}$ having maximum values $V_{MAX}$ of the voltages of 1.0 V and 0.5 V were used. A rectangular pulse illustrated in FIG. 5A was used as the switching pulse voltage signal $V_{POST2}$ output from the neuron circuit 30. Note that the pulse width of the switching pulse voltage signal $V_{POST2}$ was set to 1 ms, the maximum value of the switching pulse voltage signal $V_{POST2}$ was set to 5 V, and the minimum value of the switching pulse voltage signal $V_{POST2}$ was set to −5 V.

Figure 15:
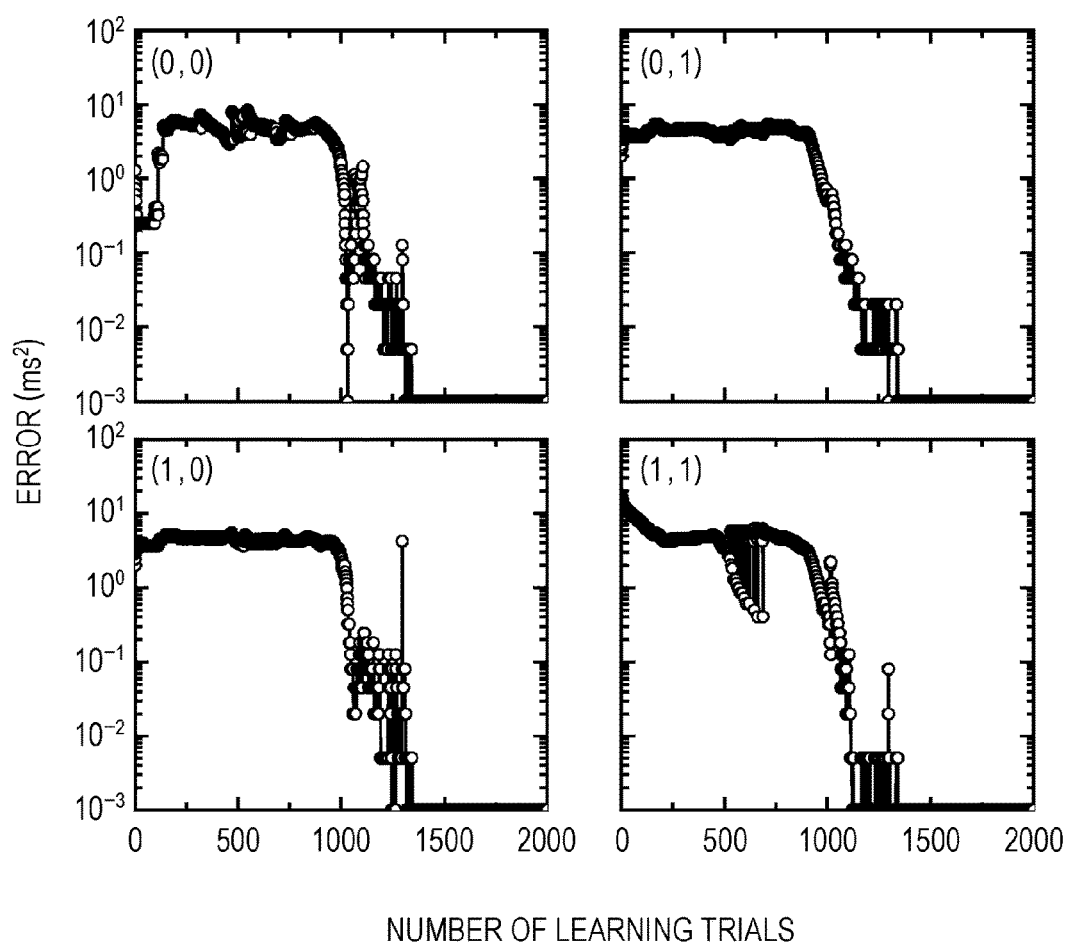
FIG. 15 is a graph illustrating a change in error when learning of exclusive OR is conducted in the neural network circuit illustrated in FIG. 14C.

FIG. 15 is a graph illustrating a change in error when the learning of exclusive OR is conducted in the neural network circuit illustrated in FIG. 14C. The error illustrated in FIG. 15 is calculated as ½ of the square of the time difference between the output signal $V_{out}$ and the teaching signal $V_t$. As illustrated in FIG. 15, the error in each of the four patterns is finally less than or equal to 0.001 ms². Thus, the learning is successful. Since the error is finally less than or equal to 0.001 ms², the time difference between the output signal $V_{out}$ and the teaching signal $V_t$ is less than or equal to 0.7%.

As can be seen from the above-described description, various modifications are other embodiments are apparent to those skilled in the art. Accordingly, the foregoing description is to be considered as illustrative only and is only given for the purpose of describing an exemplary embodiment of the disclosure for those skilled in the art. The details of the configuration and/or the function can be practically modified without departing from the spirit or the scope of the present disclosure.

For example, while the above exemplary embodiment has been described with reference to the neuron circuit 30 and the error calculating circuit 5 formed as analog circuits, the neuron circuit 30 and the error calculating circuit 5 are not limited thereto. For example, the neuron circuit 30 and the error calculating circuit 5 may be formed as digital circuits.

The present disclosure is effective to appropriately perform an error back-propagation learning operation in a neural network circuit and a learning method for use in the neural network circuit.

What is claimed is:
1. A neural network circuit comprising:
a plurality of neural network circuit elements;
an error calculating circuit;
at least one input signal terminal; and
at least one output signal terminal, wherein at least one output signal output from the at least one output signal terminal is obtained from an input signal input to the at least one input signal terminal, wherein the error calculating circuit receives the at least one output signal and teaching signals equal in number to a number of the at least one output signal terminal and generates an error voltage signal representing a voltage signal having an amplitude in accordance with a time difference between an output signal and a teaching signal corresponding to one of the least one output signal, wherein each of the neural network circuit elements includes at least one synapse circuit and a neuron circuit, wherein the synapse circuit includes a variable resistive element having a resistance value that varies when a pulse voltage is applied, wherein the neuron circuit includes a waveform generating circuit, and the waveform generating circuit generates a weight change pulse voltage signal having a predetermined first waveform that rises from a reference value to a predetermined peak value and then falls again to the reference value as time passes and a switching pulse voltage signal having a predetermined second waveform that determines a predetermined duration, wherein the weight change pulse voltage signal is input to the synapse circuit of the neural network circuit element including the neuron circuit that outputs the weight change pulse voltage signal, wherein the switching pulse voltage signal is input to the synapse circuit of the neural network circuit element other than the neural network circuit element including the neuron circuit that outputs the switching pulse voltage signal, wherein the neural network circuit element changes an amplitude of the weight change pulse voltage signal on the basis of the error voltage signal generated by the error calculating circuit, and wherein for the predetermined duration of the switching pulse voltage signal input from the neural network circuit element other than the neural network circuit element including the synapse circuit, the synapse circuit changes the resistance value of the variable resistive element of the synapse circuit using a voltage in accordance with a time difference between the switching pulse voltage signal and the weight change pulse voltage signal generated by the neuron circuit of the neural network circuit element including the synapse circuit.

2. The neural network circuit according to claim 1, wherein if the time difference between the teaching signal and the output signal is zero, the teaching signal has a reference potential, wherein if the time difference between the teaching signal and the output signal is within a predetermined range and a center potential is defined as the reference potential, the potential difference of the teaching signal from the center potential increases with increasing time difference in a bipolar manner, and wherein if the time difference between the teaching signal and the output signal is outside the predetermined range, an amplitude of the teaching signal is maintained at a maximum value of the potential difference obtained in the predetermined range in a bipolar manner.

3. The neural network circuit according to claim 1, wherein the error calculating circuit includes time difference calculating circuits equal in number to the number of the output signal terminals and a summing circuit, wherein each of the time difference calculating circuits generates the error voltage signal in accordance with a time difference between the output signal output from the corresponding output signal terminal and the teaching signal corresponding to the output signal and inputs the error voltage signal to the neuron circuit included in the neural network circuit element having an output signal that is the same as the output signal output from the output signal terminal, wherein the summing circuit generates a sum voltage signal obtained by summing the error voltage signals generated by the time difference calculating circuits and inputs the sum voltage signal to the neuron circuit included in the neural network circuit element having an output signal that is not the same as the output signal output from the output signal terminal.

4. The neural network circuit according to claim 1, wherein the variable resistive element includes a first terminal, a second terminal, and a third terminal, wherein a constant voltage based on the switching pulse voltage signal input from the neural network circuit element other than the neural network circuit element including the variable resistive element is applied between the first terminal and the second terminal, wherein a voltage in accordance with a time difference between the switching pulse voltage signal and the weight change pulse voltage signal generated by the neuron circuit of the neural network circuit element including the variable resistive element is applied between the first terminal and the third terminal for the predetermined duration of the switching pulse voltage signal input from the neural network circuit element other than the neural network circuit element including the variable resistive element, and wherein a resistance value between the first terminal and the second terminal varies in accordance with a potential difference between the first terminal and the third terminal.

5. The neural network circuit according to claim 4, wherein the synapse circuit includes a first switch that connects and disconnects the third terminal of the variable resistive element from a terminal to which the weight change pulse voltage signal generated by the neuron circuit of the neural network circuit element including the variable resistive element is input, and wherein the first switch controls the connection and disconnection on the basis of the switching pulse voltage signal input from the neural network circuit element other than the neural network circuit element including the variable resistive element.

6. The neural network circuit according to claim 4, wherein the variable resistive element is a ferroelectric memristor.

7. The neural network circuit according to claim 6, wherein the ferroelectric memristor includes a control electrode formed on a substrate, a ferroelectric layer in contact with the control electrode, a semiconductor layer formed on the ferroelectric layer, and a first electrode and a second electrode formed on the semiconductor layer, and wherein a resistance value between the first electrode and the second electrode varies in accordance with a potential difference between the first electrode and the control electrode.

8. The neural network circuit according to claim 1, wherein the neuron circuit includes an integration circuit that integrates a value of an electric current flowing in the variable resistive element of the synapse circuit and a waveform generating circuit that generates the first waveform and the second waveform in accordance with the electric current integrated by the integration circuit, and wherein the waveform generating circuit includes a multiplier circuit that multiplies a magnitude of the first waveform by a magnitude of the error voltage signal.

9. The neural network circuit according to claim 4, wherein the synapse circuit includes a second switch having one end connected to a first reference voltage source and the other end connected to the first terminal of the variable resistive element, and wherein the second switch connects the first reference voltage source to the first terminal for the predetermined duration of the switching pulse voltage signal input from the neural network circuit element other than the neural network circuit element including the synapse circuit.

10. A learning method for use in the neural network circuit according to claim 1, comprising:

changing an amplitude of the weight change pulse voltage signal output from the neuron circuit of a first neural network circuit element representing the neural network circuit element having an output signal serving as the output signal output from the output signal terminal on the basis of the error voltage signal; and subsequently changing an amplitude of the weight change pulse voltage signal output from the neuron circuit of a second neural network circuit element representing the neural network circuit element having an output signal that is not the output signal output from the output signal terminal on the basis of the error voltage signal.

11. The learning method according to claim 10, wherein a first step includes changing the resistance value of the variable resistive element of the first neural network circuit element with the resistance value of the variable resistive element of the second neural network circuit element remaining unchanged by inputting a signal having a potential that is the same as the reference value to the synapse circuit of the second neural network circuit element instead of inputting the weight change pulse voltage signal, wherein a second step includes changing the resistance value of the variable resistive element of the second neural network circuit element by causing the synapse circuit of the second neural network circuit element to generate the weight change pulse voltage signal having the first waveform generated by the neuron circuit of the neural network circuit element including the synapse circuit, and wherein the first step and the second step are repeated until a time difference between the teaching signal and the corresponding output signal reaches a predetermined value or less.

12. A neural network circuit comprising:

an error calculating circuit to which an output signal and a teaching signal are input, the error calculating circuit generating an error signal having a voltage according to a time difference between the output signal and the teaching signal;

first one or more neural network circuit elements included in an intermediate layer of the neural network circuit; and second one or more neural network circuit elements included in an output layer of the neural network circuit, the output layer outputting the output signal, wherein each of the first one or more neural network circuit elements includes first one or more synapse circuits and a first neuron circuit, wherein each of the second one or more neural network circuit elements includes second one or more synapse circuits and a second neuron circuit, wherein each of the first one or more synapse circuits and the second one or more synapse circuits includes a variable resistive element having a resistance value that varies in accordance with a voltage value of a pulse voltage applied to the variable resistive element, wherein each of the first neuron circuit and the second neuron circuit includes a waveform generating circuit that generates a weight change pulse voltage signal having a waveform that rises from a reference value to a peak value and then falls again to the reference value as time passes and a switching pulse voltage signal, wherein a first weight change pulse voltage signal representing the weight change pulse voltage signal generated by the first neuron circuit is input to each of the first one or more synapse circuits, wherein a second weight change pulse voltage signal representing the weight change pulse voltage signal generated by the second neuron circuit is input to each of the second one or more synapse circuits, wherein a first switching pulse signal representing the switching pulse signal generated by the first neuron circuit is input to each of the second one or more synapse circuits, wherein an amplitude of the first weight change pulse voltage signal and an amplitude of the second weight change pulse voltage signal are determined on the basis of the error signal, and wherein the resistance value of the variable resistive element included in each of the second one or more synapse circuits is varied on the basis of a duration of the first switching pulse voltage signal and a voltage in accordance with a time difference between the first switching pulse voltage signal and the second weight change pulse voltage signal.

13. The neural network circuit according to claim 12, wherein the switching pulse voltage signal generated by the second neuron circuit is the output signal.

* * * * *